(12) United States Patent
Breau et al.

(10) Patent No.: US 8,769,057 B1
(45) Date of Patent: Jul. 1, 2014

(54) EMPLOYING A HIERARCHY OF SERVERS TO RESOLVE FRACTIONAL IP ADDRESSES

(75) Inventors: Jeremy R. Breau, Kansas City, MO (US); John H. Bennett, III, Lawrence, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 800 days.

(21) Appl. No.: 12/780,142

(22) Filed: May 14, 2010

Related U.S. Application Data

(63) Continuation-in-part of application No. 12/693,793, filed on Jan. 26, 2010, now Pat. No. 8,250,189, which is a continuation-in-part of application No. 12/633,571, filed on Dec. 8, 2009, which is a continuation-in-part of application No. 12/437,300, filed on May 7, 2009, now Pat. No. 8,107,475.

(51) Int. Cl.
*G06F 15/177* (2006.01)

(52) U.S. Cl.
USPC ............................ 709/220; 709/222; 709/223

(58) Field of Classification Search
None
See application file for complete search history.

(56) References Cited

U.S. PATENT DOCUMENTS

| | | | |
|---|---|---|---|
| 6,697,354 B1 | 2/2004 | Borella et al. | |
| 7,474,675 B2 * | 1/2009 | Park et al. | 370/469 |
| 7,606,191 B1 | 10/2009 | Breau et al. | |
| 7,970,765 B1 * | 6/2011 | Olsen et al. | 707/737 |
| 8,059,643 B1 | 11/2011 | Shojayi et al. | |
| 8,107,475 B1 | 1/2012 | Shojayi et al. | |
| 8,151,325 B1 | 4/2012 | Bennett, III et al. | |
| 8,250,189 B1 | 8/2012 | Breau et al. | |
| 8,335,210 B1 | 12/2012 | Breau et al. | |
| 8,358,648 B1 | 1/2013 | Breau et al. | |
| 8,478,891 B1 | 7/2013 | Breau et al. | |
| 2001/0040895 A1 | 11/2001 | Templin | |
| 2004/0052257 A1 | 3/2004 | Abdo et al. | |
| 2005/0175010 A1 | 8/2005 | Wilson et al. | |
| 2006/0165062 A1 | 7/2006 | Nishida et al. | |
| 2006/0227792 A1 | 10/2006 | Wetterwald et al. | |
| 2008/0059464 A1 | 3/2008 | Law et al. | |
| 2008/0181216 A1 | 7/2008 | Breau et al. | |
| 2009/0304026 A1 | 12/2009 | Hamada | |
| 2009/0320087 A1 * | 12/2009 | Song et al. | 725/131 |

OTHER PUBLICATIONS

Notice of Allowance and Fees Due in U.S. Appl. No. 12/437,300 mailed Oct. 3, 2011, 10 page.

(Continued)

*Primary Examiner* — Rupal Dharia
*Assistant Examiner* — Van Kim T Nguyen

(57) ABSTRACT

Computer systems, computer-readable media, and computerized methods for resolving fractional IP addresses using domain name system (DNS)-enabled devices are provided. The system includes a local DNS server that accesses a correlation table, which maintains a mapping between fractional IP addresses and domain names. The fractional IP addresses each represent an IPv4 address paired with a respective value of an IP version field. The system also includes a client device that is capable of transmitting to the local DNS server a request message, which includes a destination name of a device targeted by the client device. Upon receiving the request message, the local DNS server compares the destination name against the correlation table. When a match is discovered within the domain names populated within the correlation table, the local DNS server identifies and transmits to the client device a fractional IP address mapped to the matching domain name.

19 Claims, 17 Drawing Sheets

(56) References Cited

OTHER PUBLICATIONS

Notice of Allowance and Fees Due in U.S. Appl. No. 12/693,793 mailed Apr. 12, 2012, 18 pages.
Office Action mailed Mar. 22, 2011 in U.S. Appl. No. 12/437,300, 25 pages.
"Reverse DNS Lookup", retrieved Apr. 16, 2010, 3 pages, http://en.wikipedia.org/wiki/Reverse_DNS_Lookup.
"Domain Name System", retrieved Apr. 16, 2010, 15 pages, http://en.wikipedia.org/wiki/Domain_Name_System.
"AX Series: IPv4 & IPv6 Dual Stack", 2005, A10 Networks, 3 pages, http://www.a10networks.com/products/axseries-ipv.php.
Durand, Alain, "Sharing a Single IPv4 Address Among Many Broadband Customers", pp. 1-9, http://www.nanog.org/mtg-0710/presentations/Durand-lighting.pdf.
"IPV4 Address Exhaustion", 7 pages, May 7, 2009, http://en.wikipedia.org/wiki/IPv4_address_exhaustion.
"Network Address Translation", 10 pages, May 4, 2009, http://en.wikipedia.org/wiki/Network_address_translation.
Iljitsch Van Beijnum, "IPv4 Address Consumption", 2009, 5 pages, The Internet Protocol Journal, vol. 10, No. 3., http://www.cisco.com/web/about/ac147/archived_issues/ipj_10-3/103_addr-cons.html.
"Classless and Subnet Address Extensions", http://triton.towson.edu/~rhammell/Ait622/Chap09_post.ppt#370,1, Classless.
First Action Interview Office Action mailed Dec. 26, 2012 in U.S. Appl. No. 12/633,571; 6 pages.
Final Office Action mailed Feb. 27, 2013 in U.S. Appl. No. 12/633,571; 23 pages.
Bush et al. The A+P Approach to the IPv4 Address Shortage draft-ymbk-aplusp-03 (Mar. 2009).

* cited by examiner

| + | Bits 0-3 | 4-7 | 8-15 | 16-18 | 19-31 |
|---|---|---|---|---|---|
| 0 | Version | Header length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 160 or 192+ | Data | | | | |

| HOST TABLE | | | |
|---|---|---|---|
| NAME | MAC | IP ADDRESS | VALUE |
| END ROUTER | 01-02-03-04-08 | 12.14.16.1 | 0001 |
| HOST A | 01-02-03-04-05 | 12.14.16.2 | 0100 |
| HOST B | 01-02-03-04-06 | 12.14.16.3 | 0011 |
| HOST C | 01-02-03-04-07 | 12.14.16.3 | 0100 |
| ... | ... | ... | ... |

810, 820, 830, 840

800

EMPLOYING A HIERARCHY OF SERVERS TO RESOLVE FRACTIONAL IP ADDRESSES

CROSS-REFERENCE TO RELATED APPLICATIONS

This application is a continuation-in-part of prior U.S. application Ser. No. 12/693,793 filed Jan. 26, 2010, entitled "EMPLOYING IP VERSION FIELDS TO DETERMINE DATA-LINK LAYER ADDRESSES," which is a continuation-in-part of prior U.S. application Ser. No. 12/633,571 filed Dec. 8, 2009, entitled "ALLOCATING IP VERSION FIELDS TO INCREASE ADDRESS SPACE," which is a continuation-in-part of prior U.S. application Ser. No. 12/437,300 filed May 7, 2009, entitled "METHOD AND PROCEDURE FOR INCREASING IPV4 ADDRESS SPACE." The teachings of U.S. application Ser. Nos. 12/693,793, 12/633,571, and 12/437,300 are hereby incorporated by reference in their entirety.

BACKGROUND

Communication among computing devices typically occurs through networks. For computing devices in a wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate to systems and methods for assigning unique network identifiers in a wired or a wireless network and using the network identifiers to determine a data-link layer (layer 2) address of a particular device, such as an intended recipient of a communication. The systems and methods facilitate assigning a unique network identifier (fractional IP address), which typically include an IPv4 address and a particular value of an IP version field, to a host device that is active on the network. As used herein, the "fractional" IP address represents a specific unique network identifier that is composed of, in part, the IPv4 address assigned to the client device along with a portion, or fraction, of a header used in addressing data packets. In an exemplary embodiment, the fraction of the header is a value entered into an IP version field, such as one of IPv0-Ipv4. Utilizing this version-based, fractional IP address allows for the assignment of many fractional IP addresses, which are unique amongst themselves, to multiple client devices that are active on the same network and that are using the same IPv4 address. Because each fractional IP address includes one of various available values of the IP version field in addition to the IPv4 address, the usefulness of a single IPv4 address is extended from one client device to multiple client devices.

Upon assigning these fractional IP addresses to various client devices within the wired or wireless network, the client devices may communicate among each other using the fractional IP addresses. In an exemplary embodiment, a host device that is preparing to initiate a communication (i.e., originating host device) may identify a name of a host device to target as the recipient of the communication (i.e., destination host device). The originating host device may then determine the destination host device's network layer (layer 3) address, or IPv4 address, by conducting a resolution process. In instances, the originating host device utilizes a domain name system (DNS) lookup to perform the resolution operation that translates the name of the destination host device to an IPv4 address and a value of an IP version field that are utilized to convey the communication. Generally, the value of the IP version field is represented by a four-bit indicator that typically indicates one of IPv0, IPv1, IPv2, IPv3, or IPv4. By way of example, the four-bit indicator is configured as a binary, transmission control protocol (TCP) header that, when paired with an IPv4 address, forms the network-unique fractional IP address.

In an exemplary embodiment, resolving fractional IP addresses employs DNS-enabled devices interconnected within a network, such as a local DNS server that is granted and maintains access to a first correlation table. Typically, the first correlation table includes a mapping between a plurality the fractional IP addresses and a plurality of domain names. By way of example, the domain names represent a plurality of web address that link to websites. In another example, the fractional IP addresses include IPv4 addresses paired with respective values of IP version fields, as discussed above.

In an exemplary embodiment of carrying out the resolution process, a client device (e.g., origination host device) is provided that transmits a request message to the local DNS server. In one instance, the request message includes a destination name of a device targeted by the client device, where the targeted device that is active on the network. By way of example, the targeted device hosts a website and the destination name links to the website. Upon receiving the request message, the local DNS server compares the destination name against the first correlation table. Further, when a match is discovered within the plurality of domain names therein, the local DNS server is configured to identify a fractional IP address mapped to the matching domain name. This fractional IP address, identified during the resolution process, may be transmitted to the client device for use in contacting the target device. In one instance, the resolved fractional IP address may point to target devices (e.g., destination host devices) connected within a local network, such as an enterprise network.

BRIEF DESCRIPTION OF THE SEVERAL VIEWS OF THE DRAWINGS

The present invention is described in detail below with reference to the attached drawing figures, wherein:

FIG. 1 illustrates an exemplary IPv4 header known in the prior art;

FIG. 8 is a diagrammatic illustration of an exemplary host table, according to an embodiment of the present invention;

DETAILED DESCRIPTION

Figure 2:
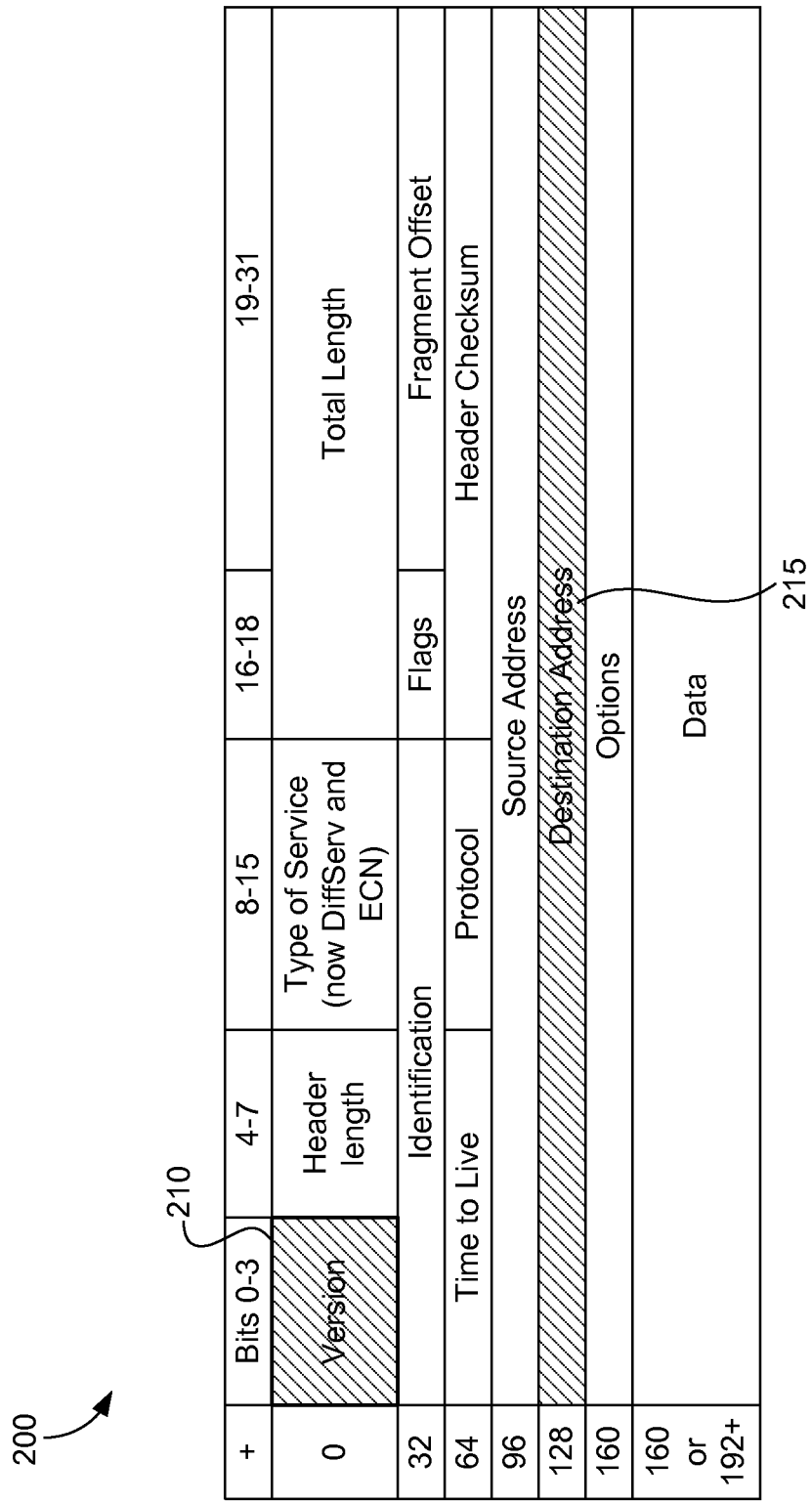
FIG. 2 illustrates an exemplary IPv4 header with a varying IP version field in accordance with an implementation of an embodiment of the invention.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the terms "step" and/or "block" or "component" might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| IP | Internet Protocol |
| IPv | Internet Protocol Version |
| LAN | Local Access Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |
| WAP | Wireless Application Protocol |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention relate to systems and methods for assigning unique network identifiers in a packet-switched wired network or in a wireless network. In these networks, information is divided into packets and routed to a destination. Internet protocol (IP) is the predominant packet-switching protocol, which enables delivery of packets from a source device to a destination device. In order for a data packet to successfully complete the journey from source to destination, each source and destination device must have a unique network identifier. Currently, each network device in a wired or wireless network is assigned an IP address as a unique network identifier. IP addresses can be assigned manually, assigned automatically through a dynamic host configuration protocol (DHCP) server, or assigned via other protocols or methods.

When employing a DHCP server, the DHCP server receives client requests for IP addresses and assigns IP addresses. When the DHCP server responds to a particular client request for an IP address by assigning a client device an IP address, the assignment is detected and the IP address that is assigned to the client device (e.g., physical network device) is written to one or more storage locations, such as a router table. In networks using address resolution protocol (ARP), a device, such as a router, stores the IP address in association with the client device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and potentially reduce the concern of IPv4 address exhaustion, implementation of IPv6 requires a significant software and hardware investment.

Accordingly, embodiments of the invention relate to assigning a unique network identifier, including an IPv4 address viewed in conjunction with a value of the IP version field, to a network device in a wired or wireless network. The systems and methods described herein make use of currently unused values of the IP version field (e.g., legacy IP versions IPv0, IPv1, IPv2, and IPv3, or potential IP versions IPv7, IPv8, etc.) and allow one IP address to be assigned to potentially multiple network devices, thus providing an immediate, cost-effective solution to IPv4 exhaustion.

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Some of these technologies are referred to as computer-storage media.

Embodiments of the present invention provide systems, methods, and computer-readable media for routing IPv4 packets based on a variation in a field in a header of the IPv4 packets. Currently, IPv4 packets are transmitted to a destination based on a destination address value in a destination address field in the IPv4 header. Another piece of information that is included in the IPv4 header is the version field. However, the version field of the IPv4 header is not currently used as a component of an IPv4 header for routing the IPv4 packets. That is, the variance of the version field in the IPv4 header is not used as a way of distinguishing destination addresses for IPv4 packets.

The present invention provides systems and methods for varying a version field in a header in an IPv4 packet as a means of increasing the number of IPv4 addresses available. By utilizing a new field for variance, the information used in the destination address field may repeat current IPv4 header information and be used in conjunction with a new IPv4 version field to create distinctions in the IPv4 header. In order to implement embodiments of the present invention, the current software used in many routers, which disregards an IP version field of a IPv4 header, may be adjusted or provided with logic to recognize the IP version field of the IPv4 header as a means of routing data packets.

Turning now to FIGS. 1 and 2, an exemplary IPv4 header 100 known in the prior art is shown in FIG. 1 and an exemplary IPv4 header 200 with a varying protocol version field is shown in FIG. 2, in accordance with embodiments of the invention. Initially, the IPv4 header 200 of FIG. 2 comprises a version field 210 with four bits and a destination address field 215. In embodiments of the invention, both the version field 210 and destination address field 215 may be used together to distinguish an IPv4 routing address, where an IPv4 routing address may have a version value and a destination address value.

Figure 3:
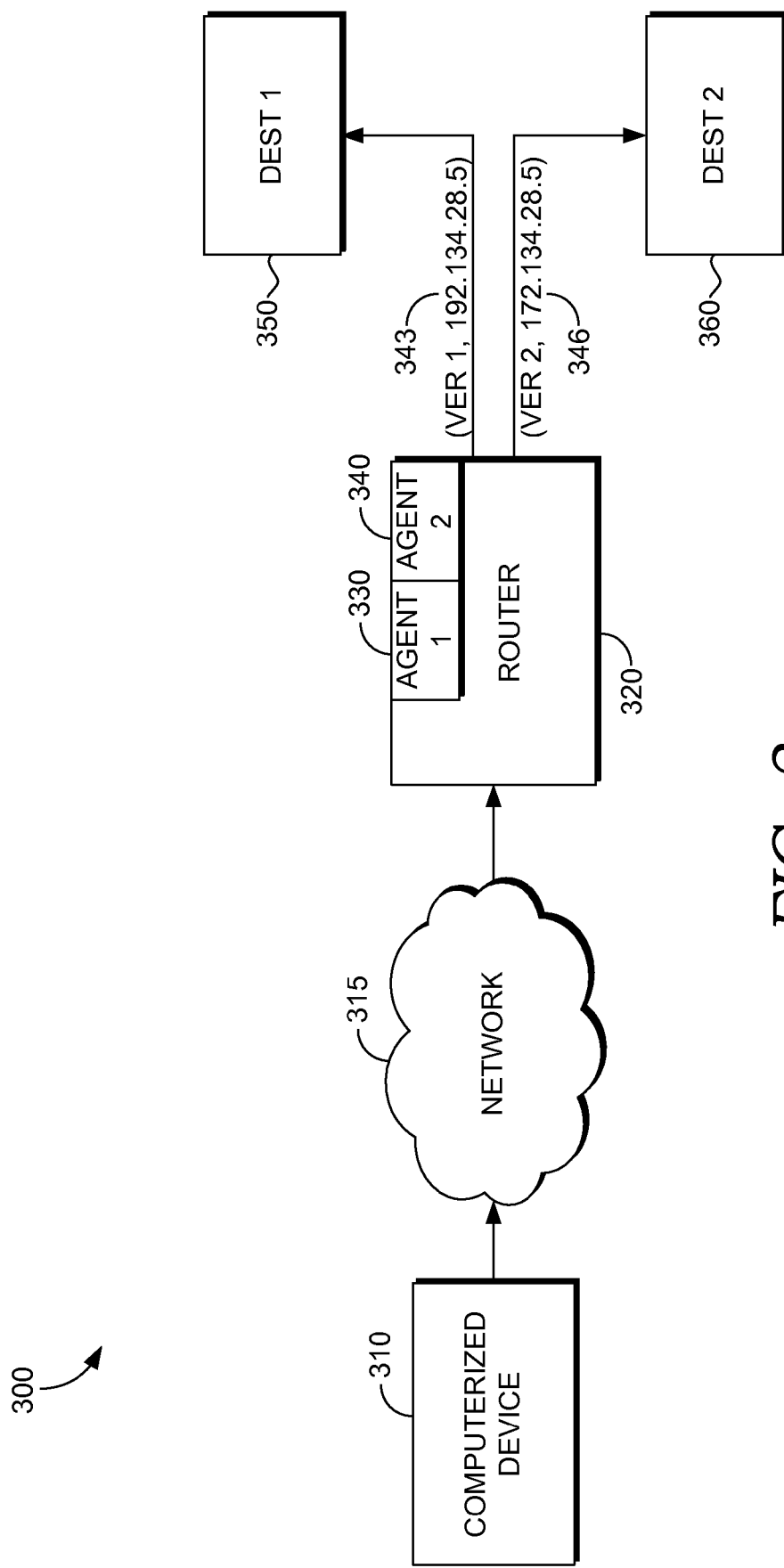
FIG. 3 provides a block diagram of an illustration of a computerized system for routing IPv4 data packets based on a variation in an IP version field in a header of the IPv4 packets.

With reference to FIG. 3, a computerized system 300 is shown that provides tangible and intangible elements for routing IPv4 data packets based on a variation in an IP version field in a header of the IPv4 packets, in accordance with an embodiment of the invention. As shown in FIG. 3, the exemplary system 300 includes a computerized device 310, a network 315, a router 320, an agent 330, an agent 340, a first routing address 343, second routing address 346, a first destination 350, and a second destination 360.

The computerized device 310 can be any computing device that is capable exchanging IPv4 data packets. In embodiments, computerized device 310 might be any computing device that can request, receive, and present web-based content. As such, computerized device 310 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, computerized device 310 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display, a power source (e.g., a battery), a data store, a speaker, a memory, a buffer, and the like.

The network 315 can be wired, wireless, or both. Further, the network 315 can be combined into a single network or can include multiple networks, as well as being a network of networks, but is shown in more simple form so as to not obscure other aspects of the present invention. For example, the network 315 may include one or more wide area networks (WANs), one or more local area networks (LANs), one or more public networks, such as the Internet, and/or one or more private networks. The network 315 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one ordinarily skilled in the art will appreciate that network 315 can enable communication between any number of user devices using, for example, Wireless Access Protocol (WAP).

The computerized device 310 may generate a first IPv4 data packet and a second IPv4 data packet. The first IPv4 data packet may have a routing address 343 of (version 1, 192.134.28.5) and the second IPv4 data packet may have a routing address 346 of (version 2, 192.134.28.5), wherein a routing address comprises a version value and a destination address value, both from the data in the fields of a first IPv4 packet and the second IPv4 packet, respectively. The first IPv4 packet may include a first version value and a first destination address value in the field in the header of the first IPv4 data packet. The second IPv4 packet may include a second version value and a second destination address value in the field in the header of the second IPv4 data packet. The first and second IPv4 packets may be transmitted over a network 315, where they may be intercepted by a router 320. Router 320 may receive the first and second IPv4 data packets, wherein the first version value in the field in the header of the first IPv4 data packet differs from the second version value in the field in the header of the second IPv4 data packet. Agent 330 at router 320 may send the first IPv4 data packet to a first destination 350 based on the first version value and the first destination address value in the first IPv4 data packet. Additionally, agent 340 at the router may send the second IPv4 data packet to a second destination 360 based on the second version value and the second destination address value in the second IPv4 data packet. Although FIG. 3 shows both agents 330 and 340, an implementation of an embodiment can have router 320 with only one agent that can route all types of IPv4 packets.

Figure 4:
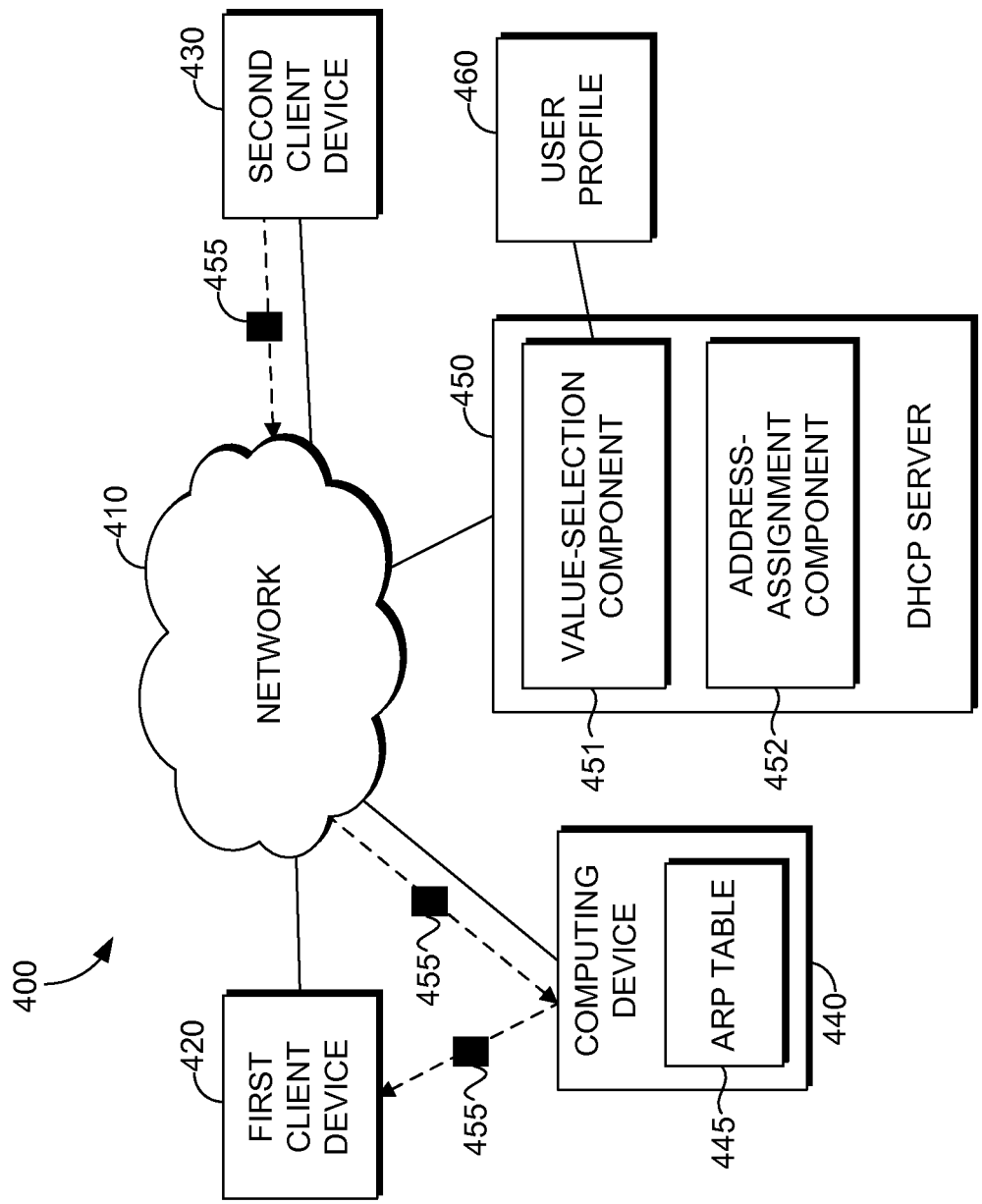
FIG. 4 is a block diagram illustrating an exemplary system architecture suitable for use in implementing embodiments of the present invention.

Turning now to FIG. 4, a block diagram illustrating an exemplary system architecture 400 suitable for use in implementing embodiments of the present invention is shown. In embodiments, the system architecture 400 is generally configured to assign network identifiers to client devices 420 and 430, and others, that are active in a network 410. As depicted, the system architecture 400 includes the client devices 420 and 430, a computing device 440, a DHCP server 450 that hosts a value-selection component 451 and an address-assignment component 452, and a user profile 460.

This exemplary system architecture 400 is but one example of a suitable environment that may be implemented to carry out aspects of the present invention, and is not intended to suggest any limitation as to the scope of use or functionality of the invention. Neither should the illustrated exemplary system architecture 400 be interpreted as having any dependency or requirement relating to any one or combination of the components 451 and 452 as illustrated. In some embodiments, one or more of the components 451 and 452 may be implemented as stand-alone devices. In other embodiments, one or more of the components 451 and 452 may be integrated directly into the computing device 440 or the client devices 420 and 430. It will be understood by those of ordinary skill in the art that the components 451 and 452 illustrated in FIG. 4 are exemplary in nature and in number and should not be construed as limiting.

Accordingly, any number of components may be employed to achieve the desired functionality within the scope of embodiments of the present invention. Although the various components of FIG. 4 are shown with lines for the sake of clarity, in reality, delineating various components is not so clear, and metaphorically, the lines would more accurately be grey or fuzzy. Further, although some features of FIG. 4 are depicted as single blocks, the depictions are exemplary in nature and in number and are not to be construed as limiting (e.g., although only two client devices 420 and 430 are shown, many more may be communicatively coupled to the DHCP server 450).

In embodiments, the DHCP server 450 is generally configured to allocate a first fractional IP address (including an IPv4 address and a first value of an IP version field), to allocate a second fractional IP address (including the IPv4 address and a second value of the IP version field), and to assign the first fractional IP address to the first client device 420 and the second fractional IP address to the second client device 430. Typically, an ARP table 445 stores, at least temporarily, the assigned first fractional IP address in association with the first client device 420 and the assigned second fractional IP address in association with the second client device 430. In embodiments, the computing device 440 can access and read the ARP table 445 upon receiving a data packet, compare a fractional IP address in a header of the data packet with entries in the ARP table 445, and direct transmission of the data packet within the network 410 based on the fractional IP address. In one instance, when traffic between the first client device 420 and the second client device 430 travels outside a local network or between partitioned networks, the computing device 440 may be embodied as a router that refers to the ARP table 445 or a routing table (having fractional IP addresses stored thereon) to properly distribute the data packets.

The DHCP server 450 and the computing device 440, in embodiments, may take the form of various types of computing devices, such as, for example, a personal computer, desktop computer, laptop computer, wireless device, consumer electronic device, handheld device (e.g., personal digital assistant), various servers, a computing cloud, and the like. It should be noted, however, that the invention is not limited to implementation on such computing devices, but may be implemented on any of a variety of different types of computing devices within the scope of embodiments of the present invention.

Further, the DHCP server 450 and the computing device 440, in embodiments, may include memory that is linked to some form of a computing unit (e.g., central processing unit, microprocessor, etc.) to support operations of the components running thereon (e.g., value-selection component 451 or address-assignment component 452). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the DHCP server 450 and the computing device 440 in order to enable each device to perform communication-related processes and other operations (e.g., allocating a value of the IP version field based on one or more criteria). In another instance, the computing unit may encompass a processor coupled to computer-readable media.

Generally, the computer-readable media stores, at least temporarily, a plurality of computer software components, including the components 451 and 452, that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Returning to FIG. 4, the first client device 420 and the second client device 430 represent two devices, of potentially millions of devices, that may be actively communicating with each other across the network 410. By way of example only and not limitation, the client devices 420 and 430 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 410. It should be noted, however, that the invention is not limited to implementation on such computing devices, but may be implemented on any of a variety of different types of computing devices within the scope of embodiments of the present invention.

In an exemplary embodiment of operation, the first client device 420 may become active on the network 410. In some instances, becoming active involves powering up and achieving connectivity with the network 410. Upon becoming active, the first client device 420 may query the DHCP server 450 with a request to provide a network identifier that is unique within the context of the network 410, thereby allowing the computing device 440 to identify a destination of data packets originating from a third-party device that are designated for either the first client device 420 or the second client device 420. Upon detecting the first client device 420 as being active on the network 410, or upon receiving the request from the first client device 420, the DHCP server may dynamically commence a process of assigning a first fractional IP address to the first client device 420. Generally, the first fractional IP address uniquely identifies the first client device 420 within the network 410 while recycling IPv4 addresses that have been previously assigned to other devices, which are active on the network 410, such as the second client device 430. Accordingly, the limited address space associated with IPv4 addresses is expanded through incorporation of IP-version-field values into data-packet headers.

The process of assigning the first fractional IP address to the first client device 420, implemented by the DHCP server 450, may initially involve assigning to the first client device 420 an IPv4 address that has values of the IP version field remaining available for allocation. Typically, there various values associated with the IP version field. These values may include legacy versions IPv0, IPv1, IPv2, and IPv3, current versions IPv4, IPv5, and IPv6, and potential versions IPv7 and up. However, in an exemplary embodiment, the potential versions IPv7 and up are excluded from being allocated to form the fractional IP address due to the possibility that the potential versions may be employed in the future to indicate a new IP version for sending data packets. Further, in an exemplary embodiment, the current versions IPv5 and IPv6 are withdrawn from being available for selection in forming the fractional IP address due to a likelihood that the computing device 440 will be confused as to whether the current version is indicating that the data packets conform with version 5 or version 6 Internet protocol, or whether the current version is simply being used to generate a unique network identifier. As such, the remaining IP-version-field values (IPv0-Ipv4) can be used without the need for future modifications or the potential of confusion, as the computing device 440 can be programmed with logic to view the remaining IP-version-field values as indicating Internet protocol version 4.

These values may be represented as a 4-bit, binary number or may be referenced in any other format that may be employed to address a data packet. By way of example, the value of IPv0 may be 0000, the value of IPv1 may be 0001, the value of IPv2 may be 0010, the value of IPv3 may be 0011, and the value of IPv4 may be 0100. Although a single configuration of the representation of the IP-version-field value has been described, it should be understood and appreciated that other types of suitable formats or representations that can identify one or more values of the IP version field may be used, and that embodiments of the present invention are not limited to those 4-bit, binary representations described herein.

In addition, those values associated with the IP version field that are currently or previously allocated to a client device on the network 410 are considered to be in use and are not available values. By way of example, the DHCP server 450 is configured to track and record the values associated with both the IP version field and a particular IPv4 address that are in use, and to target those remaining values that are not in use for allocation to the first client device 420. In embodiments, the value-selection component 451 is configured to carry out the steps of determining which IP-version-field values are appropriate to use, ascertaining which of the appropriate IP-version-field values remain available for allocation, and allocating one of the available IP-version-field to a client device. In one instance, the client device may be consistently assigned a particular IP-version-field value each time a request for a network identifier is made therefrom. An association between the client device and its assigned IP-version-field value may be written to the user profile 460. In operation, the user profile 460 may be accessed by the value-selection component 451 upon the value-selection component 451 determining which IP-version-field value to assign to the client device.

Once an IPv4 address associated with one of the available IP-version-field values is allocated to the first client device 420, the address-assignment component 452 assigns a fractional IP address to the first client device 420, where the fractional IP address uniquely identifies the first client device 420 within the network 410. In embodiments, assigning includes communicating the fraction IP address (e.g., the allocated IP-version-field value and an associated IPv4 address) to the first client device 420 and recording the fraction IP address to the ARP table 445, or another memory location. The ARP table 445 is configured to be searchable for fraction IP addresses and the client devices associate therewith, and can store the fraction IP addresses for any duration of time. Although two different components for selecting and assigning IP-version-field values have been described, it should be understood and appreciated that other types of suitable mechanisms that select available IP-version-field values based on other criteria may be used, and that embodiments of the present invention are not limited to the value-selection component 451 and the address-assignment component 452 described herein. For instance, IP-version-field values may be selected based on properties, or functional capabilities, of the client device that is requesting the network identifier.

Once the DHCP server 450 assigns to the first client device 420 the IPv4 address and an IP-version-field value (e.g., utilizing one or more of the components 451 and 452), the resultant fractional IP address is communicated to the first client device 420 and, potentially, stored at the ARP table 445 and/or at another memory location that is accessible to the DHCP server 450 or to the computing device 440. When attempting to communicate across the network 410, the first client device 420 may insert the fractional IP address into a header of IPv4 data packets that are transmitted therefrom. The fractional IP address within the header allows the computing device 440, via the ARP table 445, to identify the sender of the IPv4 data packets as the first client device 420. In addition, the computing device 440 is capable of routing IPv4 data packets 455 to the first client device 420 upon another client device, such as the second client device 430, populating the header of the IPv4 data packets 455 with the fractional IP address assigned to the first client device 420. By way of example, the computing device 440 represents a last router in a hub structure of the network 410 that inspects the IP-version-field value of the fractional IP address to properly route the IPv4 data packets 455 to the first client device 420.

Figures 5, 6:
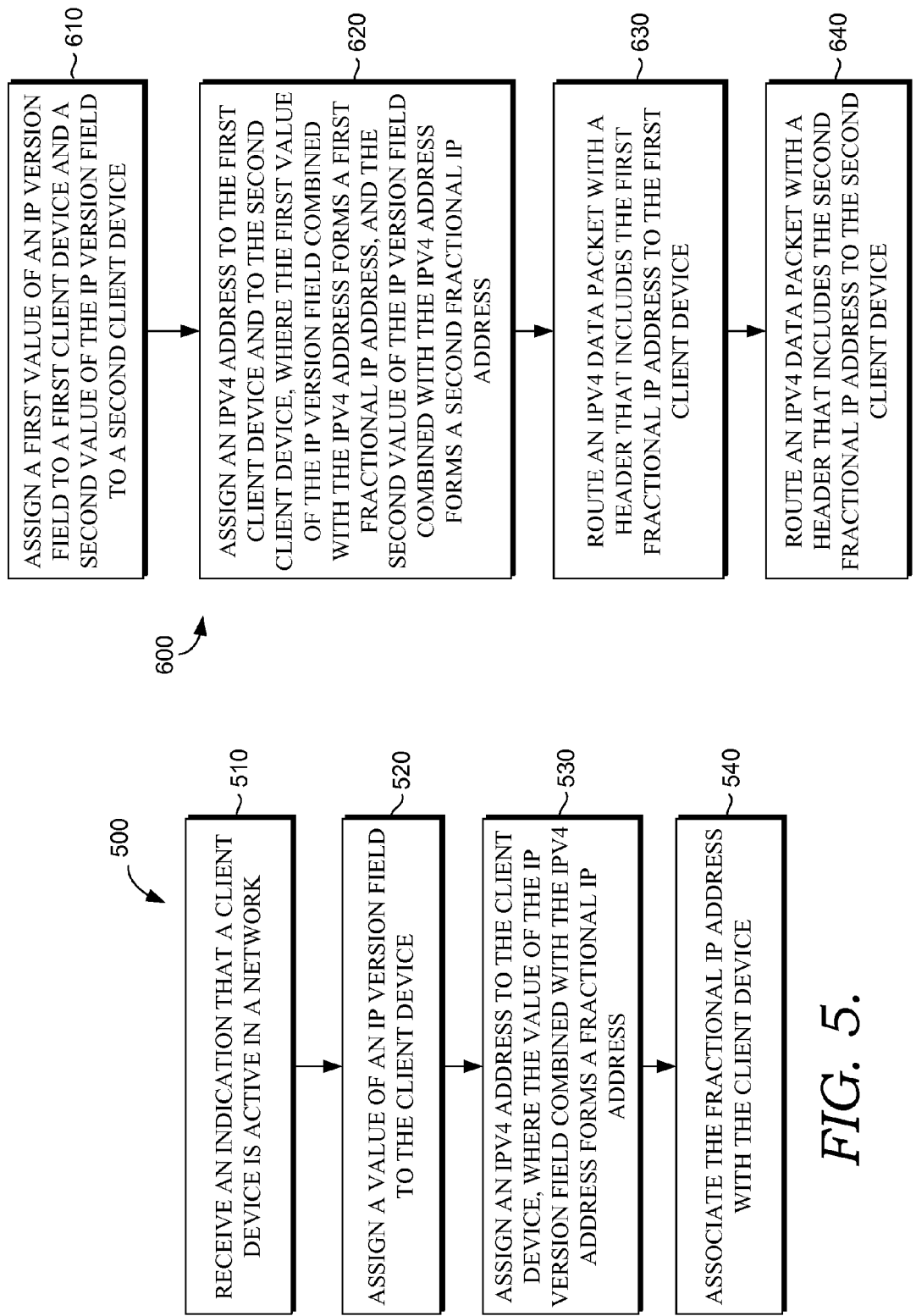
FIG. 5 is a flow chart of an exemplary method for assigning network identifiers to client devices in a network, in accordance with an embodiment of the present invention.
FIG. 6 is a flow chart of an exemplary method for assigning network identifiers to client devices in a network, in accordance with an embodiment of the present invention.

Turning now to FIG. 5, a flow chart is shown that illustrates an exemplary method 500 for assigning network identifiers to client devices in a network, according to embodiments of the present invention. The method 500 includes receiving an indication that a first client device is active in the network, as depicted at block 510. Typically, the network supports transmission of IPv4 packets using wire-line technology, wireless technology, or a combination thereof. The method 500 may further include assigning a first value of an IP version field to the first client device and assigning an IPv4 address to the first client device, as depicted at blocks 520 and 530, respectively. In one embodiment, assigning the first value of the IP version field includes selecting from a plurality of values of the IP version field that are available for assignment, such as one of legacy versions IPv0, IPv1, IPv2, and IPv3, current versions IPv4, IPv5, and IPv6, or potential versions IPv7 and up.

As described more fully above, the first value of the IP version field may be combined with the IPv4 address to form a first fractional IP address. As depicted at block 540, the first fractional IP address may be associated with the first client device. This association can be written to a memory location, such as a routing table, that is accessible by the DHCP server for storage purposes and is available to a router for directing data packets through the network. For instance, when a header of an IPv4 data packet includes the first fractional IP address, the router may refer to the routing table to identify the first client device as the destination of the IPv4 data packet.

With reference to FIG. 6, a flow chart is shown that illustrates an exemplary method 600 for assigning network identifiers to client devices in a network, according to embodiments of the present invention. The method 600 includes assigning a first value of an IP version field to a first client device and a second value of the IP version field to a second client device, as depicted at block 610. As depicted at block 620, the method 600 may further include assigning an IPv4 address to the first client device and to the second client device. Typically, the first value of the IP version field, in conjunction with the IPv4 address, forms a first fractional IP address, while the second value of the IP version field, in conjunction with the IPv4 address, forms a second fractional IP address. Upon reading the first fractional IP address incorporated in a header of an IPv4 data packet, a router, the DHCP server, or another device may be configured to route the IPv4 data packet to a first destination, such as the first client device, as depicted at block 630. In addition, upon reading the second fractional IP address incorporated in a header of an IPv4 data packet, the router, the DHCP server, or another device may be configured to route the IPv4 data packet to a second destination, such as the second client device, as depicted at block 640. Accordingly, an individual IPv4 address can be expanded to uniquely identify, within the context of the network, multiple client devices.

Figure 7:
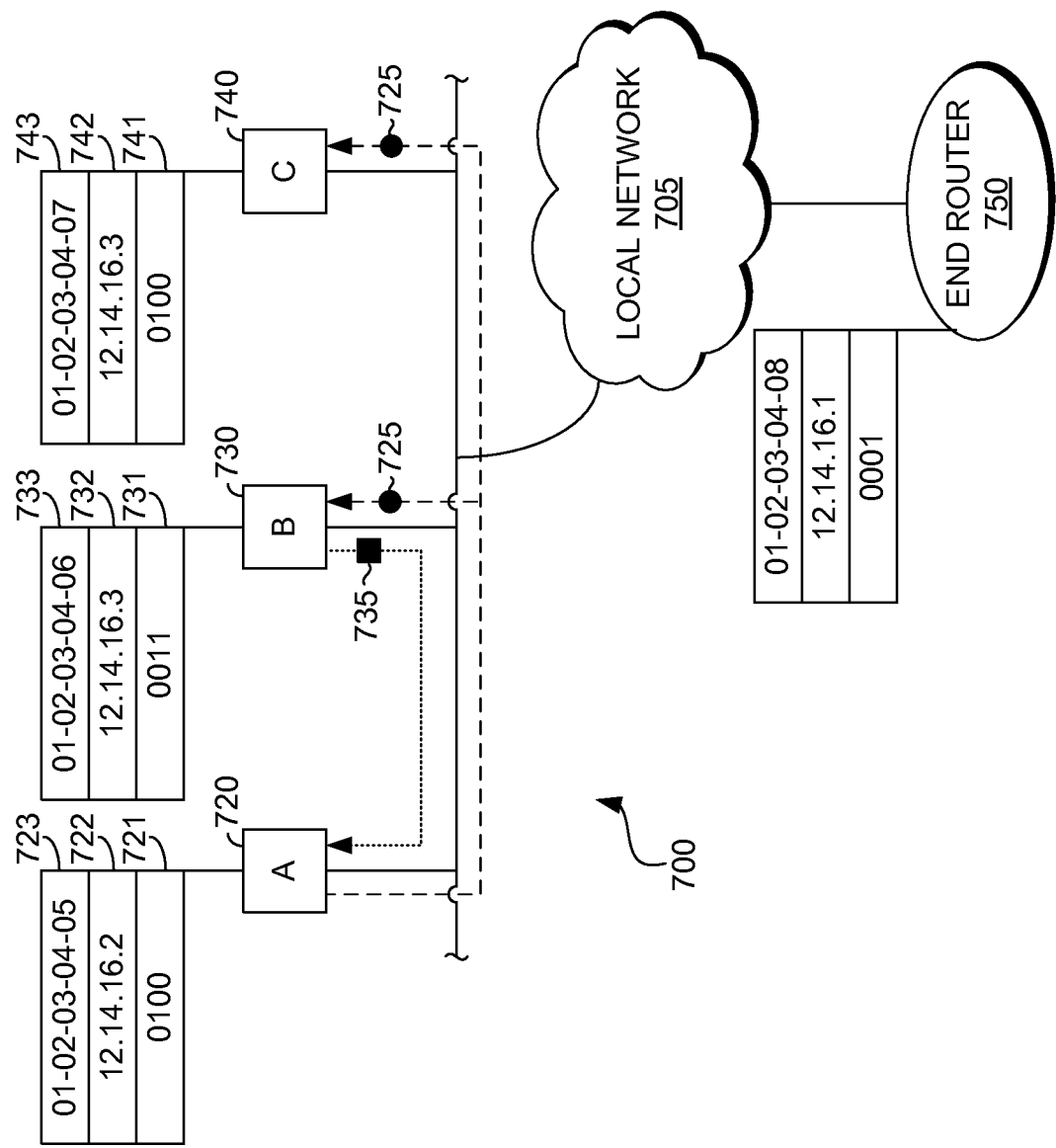
FIG. 7 is a block diagram illustrating an exemplary system architecture suitable for use in implementing embodiments of the present invention.

Turning now to FIG. 7, a block diagram illustrating an exemplary system architecture 700 suitable for use in implementing embodiments of the present invention is shown. In embodiments, the system architecture 700 is generally configured to provide the ability for host device A 720 to determine a data-link layer (layer 2) address, such as a MAC address, of other host devices within a local network 705, such as host device B 730 or host device C 740. As depicted, the system architecture 700 includes the host device A 720 (originating host device), the host device B 730 (destination host device), the host device C 740, and an end router 750 all interconnected via the local network 705.

This exemplary system architecture 700 is but one example of a suitable environment that may be implemented to carry out aspects of the present invention, and is not intended to suggest any limitation as to the scope of use or functionality of the invention. Neither should the illustrated exemplary system architecture 700 be interpreted as having any dependency or requirement relating to any one or combination of the host devices 720, 730, and 740 as illustrated. It will be understood by those of ordinary skill in the art that the host devices 720, 730, and 740 illustrated in FIG. 7 are exemplary in nature and in number and should not be construed as limiting.

Accordingly, any number of devices may be employed to achieve the desired functionality within the scope of embodiments of the present invention. Although the various devices of FIG. 7 are shown with lines for the sake of clarity, in reality, delineating various devices is not so clear, and metaphorically, the lines would more accurately be grey or fuzzy. Further, although some features of FIG. 7 are depicted as single blocks, the depictions are exemplary in nature and in number and are not to be construed as limiting (e.g., although only three host devices 720, 730, and 740 are shown, many more may be communicatively inter-coupled within the local network 705).

The host device A 720, the host device B 730, and the host device C 740 represent three devices, of potentially millions of devices, that may be actively communicating with each other across the local network 705. By way of example only and not limitation, the host devices 720, 730, and 740 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 705. In instance, the host devices 720, 730, and 740 may represent one or more of the client devices 420 and 430 of FIG. 4. It should be noted, however, that the invention is not limited to implementation on such computing devices, but may be implemented on any of a variety of different types of computing devices within the scope of embodiments of the present invention. Further, the local network 705 may be any type of network (e.g., wired, wireless, Internet, LAN, packet-switched network, and the like) that facilitates intercommunication between the host devices 720, 730, and 740.

Initially, each of the host devices 720, 730, and 740 is provisioned with a data-link layer address. The data-link layer pertains to a set of protocols that operate to within a networking architecture of the local network 705 to interconnect the host devices 720, 730, and 740 over a physical layer (layer 1). Although a variety of types of data-link layer addresses may be employed, the exemplary embodiment depicted in FIG. 7 shows the host devices 720, 730, and 740 each provisioned with a unique MAC address. In particular, the host device A 720 is provisioned with MAC address 01-02-03-04-05 (shown at reference numeral 723), the host device B 730 is provisioned with MAC address 01-02-03-04-06 (shown at reference numeral 733), and the host device C 740 is provisioned with MAC address 01-02-03-04-07 (shown at reference numeral 743). Typically, as used herein, the phrase "MAC address" generally refers to a globally unique identifier assigned to nodes (e.g., host devices 720, 730, and 740) within the local network 705. In embodiments, MAC addresses are permanently assigned by a manufacturer of the node and usually encodes the manufacturer's registered identification number.

In an exemplary embodiment of operation, each of the host devices 720, 730, and 740 is assigned a fractional IP address, which pertains to a unique network identifier of each of the nodes active within the local network 705, as discussed above. Also, as more fully discussed above, the fractional IP addresses includes an IPv4 address and a value of an IP version field. As shown in FIG. 7, the host device A 720 is assigned IPv4 address 12.14.16.2 (reference numeral 722), while the host devices 730 and 740 are assigned a common IPv4 address 12.14.16.3 (reference numerals 732 and 742). However, the fractional IP address are distinct because the host device B 730 is assigned the version value of IPv3, designated by 0011 (see reference numeral 731), while the host device C 740 is assigned version value of IPv4, designated by 0100 (see reference numeral 741). That is, the fractional IP addresses allow for the assignment of many unique network identifiers to the host devices 730 and 740 interconnected on the same local network 705 that use the same IPv4 address by assigning different, non-overlapping IP-version-field values thereto. As discussed above, various allocation processes may be employed to determine the appropriate IP-version-field value that is assigned to a particular device.

Upon assigning these fractional IP addresses to the host devices 720, 730, and 740, the host devices 720, 730, and 740 may communicate over the local network 705 using these assigned fractional IP addresses. In an exemplary embodiment, the host device 720 that is preparing to initiate a communication (i.e., originating host device) may identify a name of a host device to target as the recipient of the communication (i.e., destination host device). For instance, the originating host device A 720 may receive a user-initiated instruction to connect to a web address "Sprint.com."

The originating host device A 720 may then determine the destination host device's network (layer 3) address, or IPv4 address, by conducting a resolution operation. In instances, the originating host device A 720 utilizes a domain name system (DNS) lookup to perform the resolution operation that translates the name (e.g., Sprint.com) of the destination host device to an IPv4 address and an IP-version-field value that are accessed in combination to convey the communication.

This resolved IPv4 address in conjunction with the IP-version-field value correspond to one particular fractional IP address within the local network 705. Typically, this particular fractional IP address has been previously assigned to the destination host device by a DHCP server. Once the particular fractional IP address is known to the originating host device A 720, the originating host device A 720 broadcasts a request message 725 that includes the fractional IP address to the host devices B 730 and C 740 and other nodes connected via the local network 705. The general intent of the request message 725 is to solicit the data-link layer address, or MAC address, of the destination host device and to use the MAC address to route data packet(s) thereto.

Upon receiving the request message 725, the host devices 730 and 740 in the local network 705 may access the fractional IP address carried in the request message 725 and may compare the accessed fractional IP address against the fractional IP addresses that they have been assigned. In one embodiment, of those host devices and nodes in the local network 705 that receive the request message 725, just the destination host device may ascertain that the accessed fractional IP address in the request message 725 matches its assigned fractional IP address. For instance, if "Sprint.com" corresponds to IPv4 address 12.14.16.3 and IP-version-field value 0011, host device B 730 will likely ascertain that the fractional IP address in the request message 725 is associated with host device B's 730 assigned fractional IP address.

Accordingly, in this embodiment, just the destination host device B 730 may respond to the originating host device A 720 with a confirmation of the match and an indicia of the MAC address assigned to the destination host address B 730. For instance, upon destination host device B 730 ascertaining that the fractional IP address in the request message 725 is associated with its assigned fractional IP address, the destination host device B 730 is now self-identified as the proper destination host device and sends a response 735 to the originating host device A 720. In addition, the destination host device B 730 may include within the payload of the response 735 its MAC address 01-02-03-04-06 (see reference numeral 733).

Upon receiving the response 735 from the destination host device B 730, the originating host device A 720 is configured to write an entry into a host table that includes the MAC address 733 mapped to the fractional IP address 731 and 732 assigned to the destination host device B 730. Turning now to FIG. 8, a diagrammatic illustration of an exemplary host table 800 is shown, according to an embodiment of the present invention. As show, entry 830 of the host table 800 reflects the information communicated to the originating host device A 720 within the response 735.

In other embodiments, a plurality of nodes within the local network respond to the request message 725. In one instance, the nodes that have been assigned a IPv4 address common to the IPv4 address in the request message 725 may respond without comparing IP-version-field value within the request message 725 against their assigned IP-version-field value. In another instance, a multitude of nodes may respond to the request message 725 without further comparing the information of the request message 725 against their assigned network identifiers. As such, the originating host device A 720 may receive a plurality of responses from interconnected nodes and may write information conveyed in one or more of the plurality of responses to the host table 800. As depicted at FIG. 8, an end router 750 of FIG. 7, as well as host devices B 730 and C 740 have responded to the request message 725. Further, the originating host device A 720 has written the information from the end router 750, and host devices B 730 and C 740 into the host table 800 as entries 810, 830, and 840, respectively.

In the embodiment where many nodes of the local network 705 have responded to the request message 725, the originating host device A 720 may sort through the host table 800 to determine the appropriate destination host device. In one instance, sorting through the host table 800 may involve the originating host device A 720 comparing the IP-version-field value that was identified in the resolution process against the IP-version-field values written within the entries 810, 830, and 840 of the host table 800. In this instance, the originating host device A 720 may select the appropriate destination host device upon ascertaining that the resolved IP-version-field value matches an IP-version-field value assigned to one or more nodes. Additionally, the originating host device A 720 may select the appropriate destination host device upon ascertaining that the resolved IPv4 address matches an IPv4 address assigned to one or more nodes that have responded. Upon selecting the appropriate destination host device (i.e., identifying a host device whose assigned IPv4 address corresponds with the resolved IPv4 address and whose assigned IP-version-field address includes the resolved port or range of ports), the originating host device A 720 identifies a MAC address of the appropriate destination host device by inspecting the data-link layer address mapped thereto within the host table 800.

Although a single configuration of the host table 800 has been described, it should be understood and appreciated by those of ordinary skill in the art that other types of suitable formats that allow for entries to be added, updated, and removed may be used, and that embodiments of the present invention are not limited to those line-type entries 810, 820, 830, and 840 described herein. Further, the number of and information within the entries of the table 800 may vary from those shown in FIG. 8. For instance, in the embodiment where just those nodes that are assigned an IPv4 address that matches the resolved IPv4 address are configured to provide a response to the request message 725, a column that includes "IP addresses" may be removed from the host table 800 for being redundant.

Further, in typical embodiments, the column that includes a "Name" of the nodes represented in the host table 800 would not be present. Accordingly, the "Name" column is shown in FIG. 8 for the purpose of explaining aspects of the present invention and for general demonstration reasons only. But, in some instances, where the host table 800 is configured as an ARP table accessible by or residing on a DHCP server, the "Name" column might be present and populated with identifiers of various nodes in a local network.

Further, the host table 800 may be stored in any location that is operably coupled to the originating host device A 720, thereby allowing access thereto. In one embodiment, a DHCP server may temporarily store at an ARP table the assigned fractional IP addresses in conjunction with MAC addresses, similar to the configuration shown in the host table 800. In another embodiment, a router may store in a routing table the fractional IP addresses in conjunction with MAC addresses, similar to the configuration shown in the host table 800. In operation, the router 750 may employ the routing table to direct data packets that are transmitted outside the local network 705. These embodiments are more fully discussed below.

Referring back to FIG. 7, in one embodiment, when the originating host device A 720 constructs data packet(s) to transmit to the destination host device, which was determined to be the host device B 730 in this embodiment, the originating host device A 720 may read the host table 800 of FIG. 8 to determine the MAC address of the destination host device B 730. Upon determining the MAC address of the destination host device B 730, the originating host device A 720 typically incorporates the MAC address into a pre-designated portion of the header of the data packet(s). Consequently, the destination host device B 730 may properly receive the data packet(s) upon transmission from the originating host device A 720.

Figure 9:
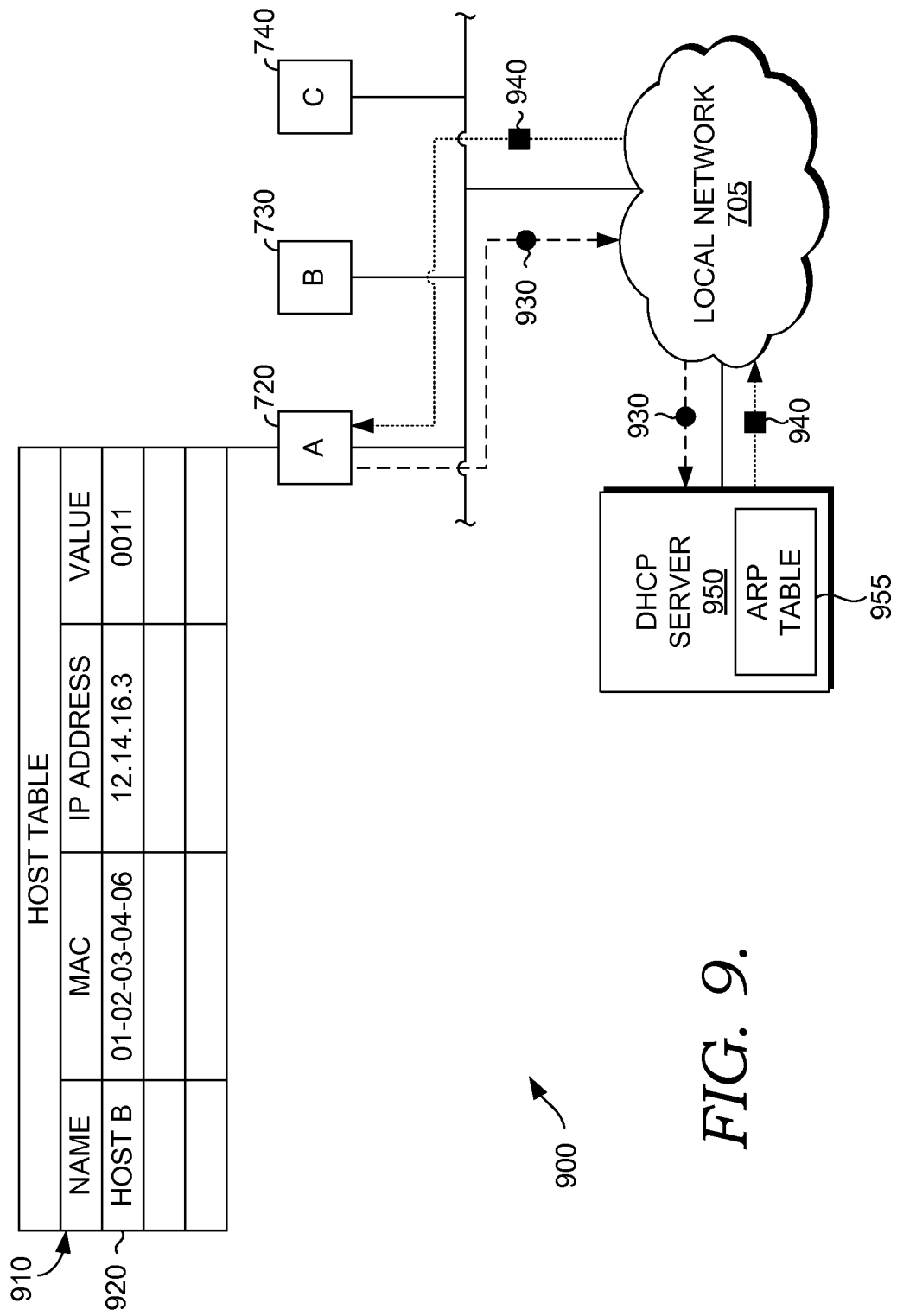
FIG. 9 is a block diagram illustrating an exemplary system architecture for determining a data-link layer address from a network address, according to an embodiment of the present invention.

Referring now to FIG. 9 a block diagram illustrating an exemplary system architecture 900 for routing data packets using a data-link layer address is shown, according to embodiments of the present invention. Initially, FIG. 9 includes a DHCP server 950 that has stored thereon an ARP table 955. In this embodiment, the DHCP server 950 is generally employed to determine a MAC address of an appropriate destination host device upon being solicited by the originating host device A 720. This embodiment essentially eliminates the process of sending request messages 930 to a multitude of host devices interconnected within the local network 705.

In embodiments, the DHCP server 950 is generally configured to receive the request message 930 from an originating host device, such as the host device A 720, and return a reply 940 with a data-link layer address, such as a MAC address. In an exemplary embodiment, the DHCP server 950 is further configured to allocate a first fractional IP address (including an IPv4 address and a first range of ports), to allocate a second fractional IP address (including the IPv4 address and a second range of ports), to allocate a third fractional IP address (including the IPv4 address and a third range of ports), and to assign the first, second, and third fractional IP addresses to the host devices 720, 730, and 740, respectively—similar to the functionality of DHCP server 450 of FIG. 4.

Typically, the DHCP server 950 is operably coupled to the ARP table 955 (e.g., ARP table 445 of FIG. 4) that stores, at least temporarily, the assigned fractional IP addresses in association with the respective host devices 720, 730, and 740, as well as their MAC address. For instance, with regard to the originating host device A 720, the ARP table 955 may maintain the assigned IPv4 address 12.14.16.2 (shown at reference numeral 722 of FIG. 7) and the assigned IP-version-field value (shown at reference numeral 721 of FIG. 7) in association with an indicia of the host device A 720, and its MAC address 01-02-03-04-05 (see reference numeral 723 of FIG. 7).

The DHCP server 950, in embodiments, may take the form of various types of computing devices, such as, for example, a personal computer, desktop computer, laptop computer, wireless device, consumer electronic device, handheld device (e.g., personal digital assistant), various servers, processing units distributed within a computing cloud, and the like. It should be noted, however, that the invention is not limited to implementation on such computing devices, but may be implemented on any of a variety of different types of computing devices within the scope of embodiments of the present invention. Further, the DHCP server 950, in embodiments, may include memory that is linked to some form of a computing unit (e.g., central processing unit, microprocessor, etc.) to support operations running thereon. In another instance, the computing unit may encompass a processor coupled to computer-readable media that stores, at least temporarily, information (e.g., ARP table 955) that is readable or executable by the processor.

As discussed above, in an embodiment of operation, the DHCP server 950 is configured to receive the request message 930 from the originating host device A 720. In an exemplary embodiment, the request message 930 may take the form of an ARP request. As used herein, the phrase "ARP request" generally refers to a computer networking protocol for determining a host device's data-link layer (layer 2) address when just the network (layer 3) address is known. Further, this protocol may be employed in local area networking as well as for routing inter-networking traffic across gateways or routers based on IP addresses. In operation, ARP allows nodes on the same broadcast domain, or local network 705, to intercommunicate with each other. However, although the ARP request is described as an exemplary embodiment, the request message 930 may be implemented utilizing various other communications technologies or protocols.

Typically, the request message 930 includes an IPv4 address and an IP-version-field value that was determined during the resolution operation discussed above. Upon identifying the resolved IPv4 address and the IP-version-field value carried in the request message 930, the DHCP server 950 accesses the ARP table 955 that is populated with a plurality of entries. These entries may be created upon assigning the fractional IP addresses to the host devices 720, 730, and 740 when they become active within the local network 705. Also, these entries in the ARP table 955 may include MAC addresses mapped to both IPv4 addresses and IP-version-field values.

Next, in embodiments, the DHCP server 950 may compare the resolved IPv4 address received in the request message 930 against the IPv4 addresses in the ARP table 955 to determine a match, and may further compare the IP-version-field value received in the request message 930 against the IP-version-field value associated with the IPv4 address that matches the received IPv4 address. When IP-version-field value associated with the matching IPv4 address is determined to include the resolved IP-version-field value, the DHCP server 950 selects the MAC address mapped to the matching IPv4 and sends the response 940 that includes the selected MAC address to the originating host device A 720.

As discussed above, upon receiving the response 940 from the DHCP server 950, the originating host device A 720 may store the MAC address of the destination host device. In an exemplary embodiment, the originating host device A 720 may store the MAC address, IPv4 address, IP-version-field value, and other indicia (e.g., name) of the destination host device as an entry 920 in a host table 910. Because just one device, which is host device B 730 in this example, is referenced in the response 940 as the destination host device, the host table 910 may include less entries than the host table 800 of FIG. 8.

Figure 10:
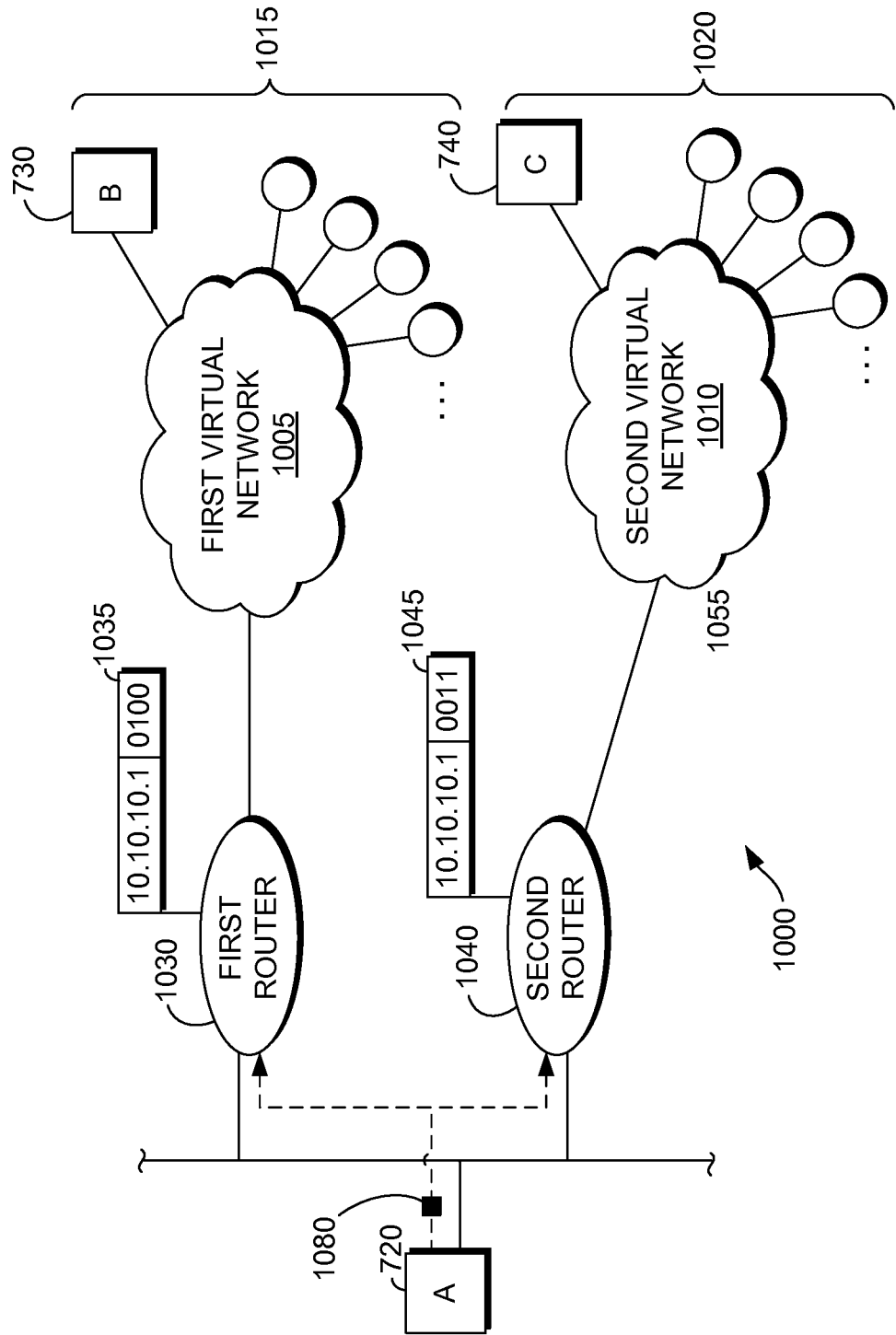
FIGS. 10 and 11 are block diagrams illustrating exemplary system architectures for routing data packets by incorporating a data-link layer address into headers of the data packets, according to embodiments of the present invention.
Figure 11:
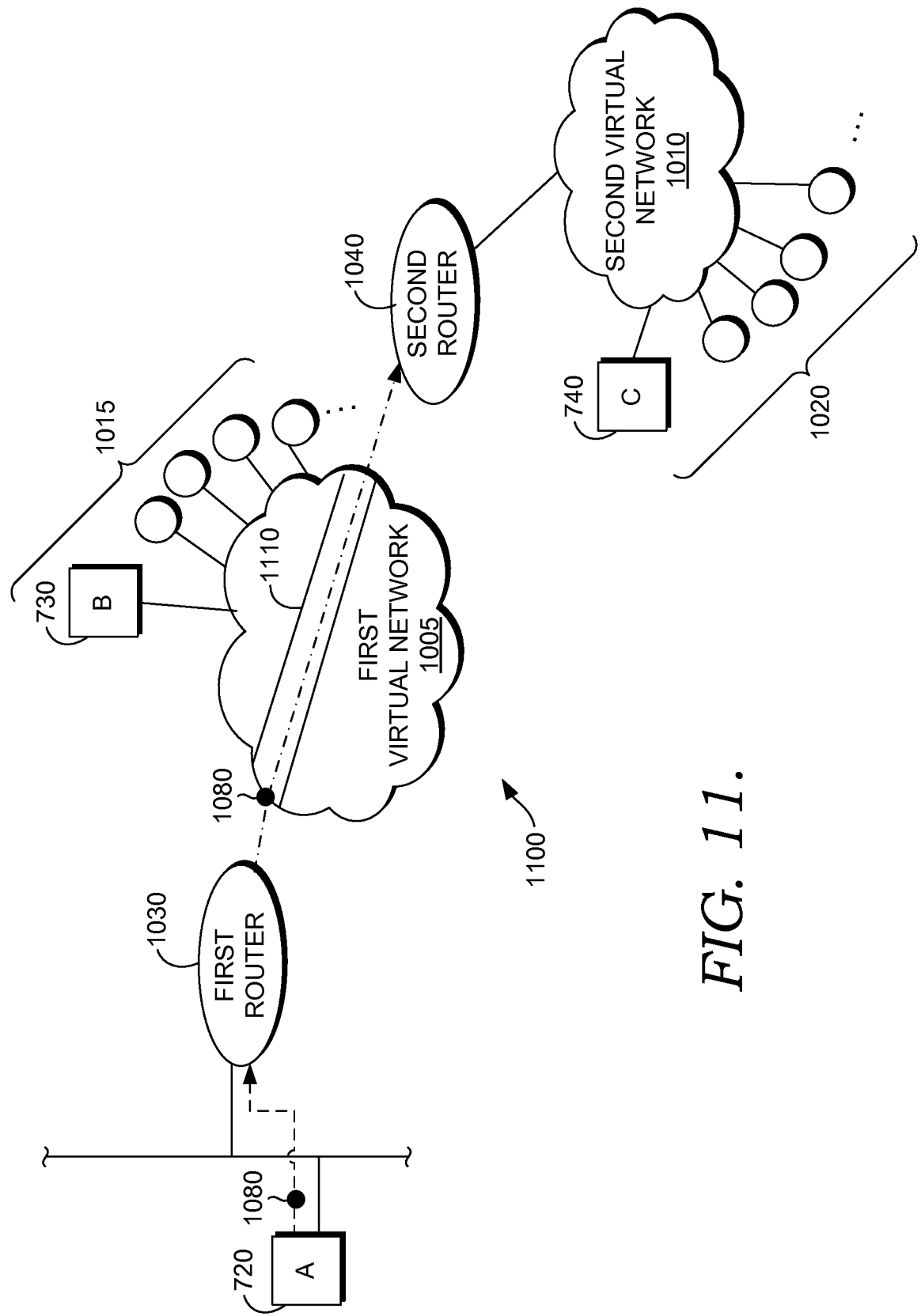

Turning now to FIGS. 10 and 11, block diagrams illustrating exemplary system architectures 1000 and 1100, respectively, for routing data packets 1080 are shown, according to embodiments of the present invention. With reference to FIG. 10, the host device A 720 is depicted sending data packets, represented by reference numeral 1080, within a network, such as a local network or an enterprise network. These data packets 1080 may be received by a first router 1030 and a second router 1040. In the embodiment illustrated in FIG. 10, the routers 1030 and 1040 are interconnected to the host device 720 (originating host device) in parallel. Further, the first router 1030 is assigned a first IP-version-field value "0100" (reference numeral 1035), while the second router 1040 is assigned a second IP-version-field value "0011" (reference numeral 1045). In operation, the first router 1030 serves as a gateway to a first virtual network 1005 that interconnects a plurality of nodes 1015, where the nodes 1015 include the host device B 730. The second router 1040 serves as a gateway to a second virtual network 1010 that interconnects a plurality of nodes 1020, where the nodes 1020 include the host device C 740. In an exemplary embodiment, the nodes 1015 connected via the first virtual network 1005 are assigned fractional IP addresses that include the first value 1035 of the IP version field, while the nodes 1020 connected via the second virtual network 1020 are assigned fractional IP addresses that include the second value 1045 of the IP version field. Accordingly, the network of FIG. 10 is partitioned into the first virtual network 1005 and the second virtual network 1010. Thus, the network is configured to logically or physically segregate the nodes 1015 from the nodes 1020. By way of example, this segregation may be established for reasons of security (i.e., disallowing communication between the nodes 1015 and the nodes 1020).

As discussed above, the data packets 1080 include an IPv4 address and a value of an IP version field that, in combination with the IPv4 address, uniquely identifies a destination host device within the enterprise network. By way of example, the IPv4 address is 12.14.16.3 and the value of the IP version field is 0011. As shown in FIG. 7, the fractional IP address formed by the combination of the example IPv4 address 12.14.16.3 and example IP-version-field value 0011 uniquely identifies the host device B 730 as the destination host device.

Upon receiving the data packets 1080, the routers 1030 and 1040 access respective routing tables associated therewith. In embodiments, these routing tables are populated with a plurality of entries. Typically, one or more of the plurality of entries include IPv4 addresses associated with the particular IP-version-field value assigned to the routers 1030 and 1040, respectively. In embodiments, the routers 1030 and 1040 compare their assigned value of the IP version field against the IP-version-field value received in the data packets 1080 to determine a match. As shown in FIG. 10, the IP-version-field value 1035 assigned to the first router 1030 matches the example value (0100) of the IP version field included in the data packets 1080, while the IP-version-field value 1045 assigned to the second router 1040 is distinct from the example value of the IP version field included in the data packets 1080. In embodiments, when the value of the IP version field in the data packets 1080 matches the value of the IP version field assigned to a router, the router identifies an entry within its associated routing table that references the IPv4 address included in the data packets 1080. In the example above, the first router 1030 would be responsible for inspecting its routing table to identify an entry that includes an IPv4 address that corresponds with the IPv4 address in the data packets 1080.

Upon identifying the entry that includes the IPv4 address that corresponds with the IPv4 address in the data packets 1080, the first router 1030 is then configured to select a MAC address referenced by the identified entry in the routing table. The selected MAC address, in embodiments, may be incorporated within a header of the data packets 1080. Further, the first router 1030 may transmit the data packets 1080, which are routed to the destination host device B 730 based on, in part, the MAC address. Further, upon selecting the MAC address referenced by the identified entry in the routing table, the first router 1030 may send the selected MAC address in a response to the originating host device A 720 for storage in the host table.

With reference to FIG. 11, the originating host device A 720 is depicted sending the data packets 1080, within a network. These data packets 1080 are be received by the first router 1030 before the second router 1040. In the embodiment illustrated in FIG. 11, the routers 1030 and 1040 are interconnected to the originating host device 720 in series. Further, as discussed in FIG. 10, the first router 1030 is assigned the first IP-version-field value "0100," while the second router 1040 is assigned the second IP-version-field value "0011." As above, the first router 1030 serves as the gateway to the first virtual network 1005, which includes the nodes 1015 and the host device B 730, while second router 1040 serves as the gateway to the second virtual network 1010, which includes the nodes 1020 and the host device C 740.

In operation, if the first IP-version-field value assigned to the first router 1030 matches the value of the IP version field included in the data packets 1080, the first router 1030 attempts to direct the data packets 1080 to one of the nodes 1015 within the first virtual network 1005. However, if the first IP-version-field value is distinct from the value of the IP version field included in the data packets 1080, the first router 1030 may forward the data packets to another router in a series of routers. The determination of which router to forward the data packets 1080 to may be based, in part, on instructions within a forwarding table accessible to the first router 1030. In the exemplary embodiment of FIG. 11, the first router 1030 forwards the data packets 1080 to the second router 1040. In one instance, the data packets 1080 are routed via a tunnel 1110 through the first virtual network 1005; thus, ensuring a secure passage of the data packets 1080 to the second router 1040. Upon the second router 1040 receiving the data packets 1080, the second router 1040 compares the second IP-version-field value assigned thereto against the value of the IP version field included in the data packets 1080. If a match is determined, the second router 1040 attempts to direct the data packets 1080 to one of the nodes 1020 within the second virtual network 1010. Otherwise, the data packets 1080 are forwarded to another router or deleted.

Figures 12, 13:
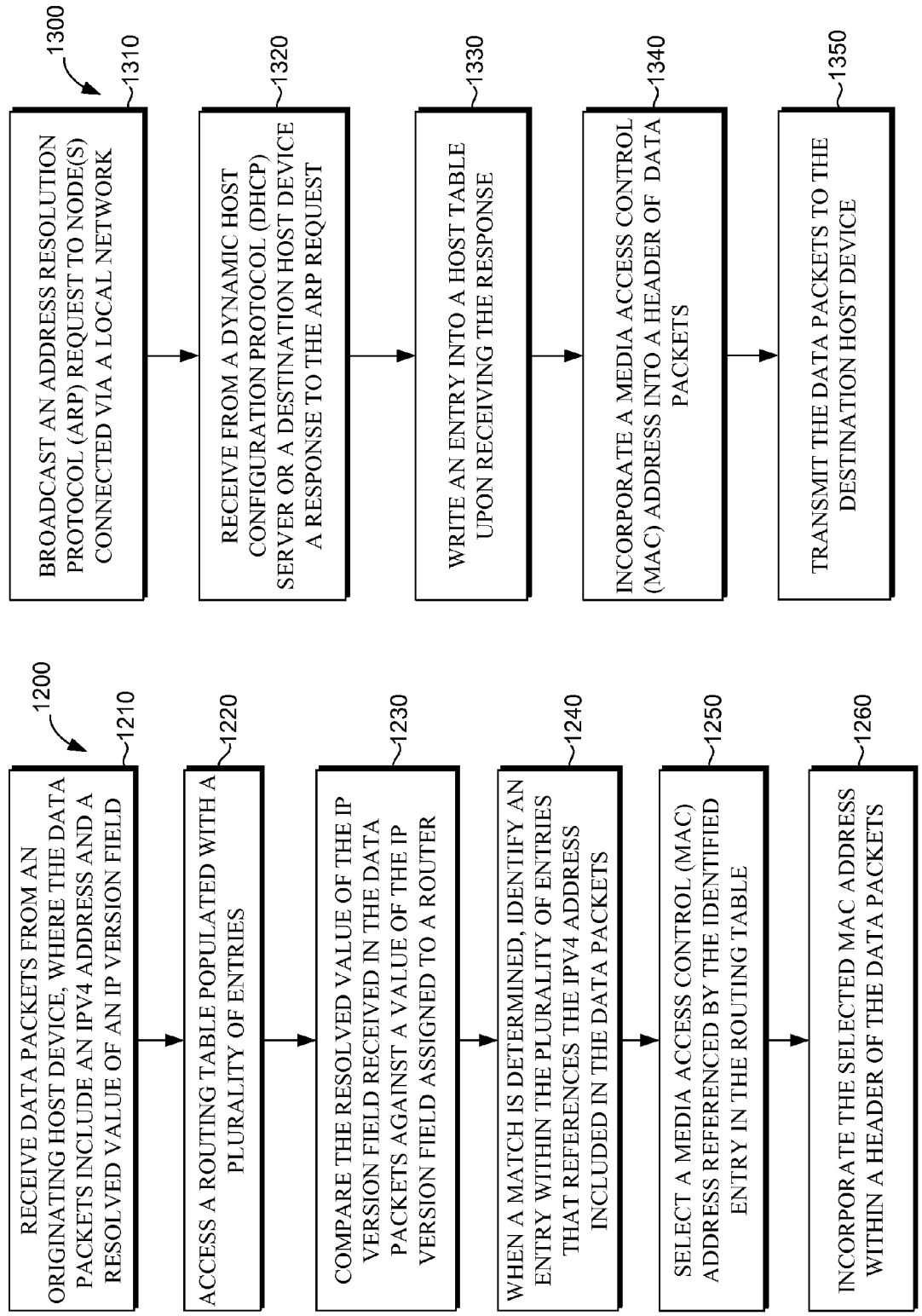
FIG. 12 is a flow chart of an exemplary method for determining a media access control (MAC) address upon being solicited by an originating host device, according to an embodiment of the present invention.
FIG. 13 is a flow chart of an exemplary method a method for routing one or more data packets within a local network based on, in part, a MAC address, according to an embodiment of the present invention.

Turning now to FIG. 12, a flow chart is illustrated that shows an exemplary method 1200 for determining a MAC address upon being solicited by an originating host device, according to an embodiment of the present invention. At some point, data packets are received at a router from an originating host device, as depicted at block 1210. In embodiments, the data packets include an IPv4 address and a resolved value of an IP version field that, in combination with the IPv4 address, uniquely identifies a destination host device within a network, such as a privately owned enterprise network. As depicted at block 1220, a routing table populated with a plurality of entries is accessed by the router receiving the data packets. In embodiments, one or more of the plurality of entries include IPv4 addresses associated with a value of the IP version field assigned to the router. As depicted at block 1230, the resolved value of the IP version field received in the data packets is compared against the assigned value of the IP version field to determine a match. When the resolved value of the IP version field matches the assigned value of the IP version field, an entry within the plurality of entries that references the IPv4 address included in the data packets is identified, as depicted at block 1240. As depicted at block 1250, a MAC address referenced by the identified entry in the routing table is selected. The selected MAC address may be incorporated within a header of the data packets, as depicted at block 1260. Typically, data packets are routed to the destination host device based on, in part, the MAC address.

With reference to FIG. 13, a flow chart is illustrated that shows an exemplary method 1300 for routing one or more data packets within a local network using a MAC address, according to an embodiment of the present invention. Initially, an originating host device may broadcast an ARP request to a plurality of nodes, such as the host devices and the servers described above, connected via the local network, as depicted as block 1310. In an exemplary embodiment, the nodes include the DHCP server, the originating host device, and a destination host device. As more fully described above, the ARP request includes an IPv4 address and a value of an IP version field. As depicted at block 1320, a response to the ARP request is received from the DHCP server or the destination host device. Typically, the response includes a MAC address that identifies the destination host device within the local network and a fractional IP address assigned to the destination host device by the DHCP server. In an exemplary embodiment, the fractional IP address comprises the IPv4 address and the value of the IP version field included in the ARP request. Upon receiving the response, the originating host device may, at least temporarily, write an entry into a host table, as depicted at block 1330. As described above with reference to the host table 800 of FIG. 8, the entry includes the MAC address mapped to the fractional IP address and, in instances, an identifier of the destination host device. As depicted at block 1340 the MAC address may be incorporated into a header of one or more data packets. These data packets are then transmitted from the originating host device to the destination host device, as depicted at block 1350.

Figure 14:
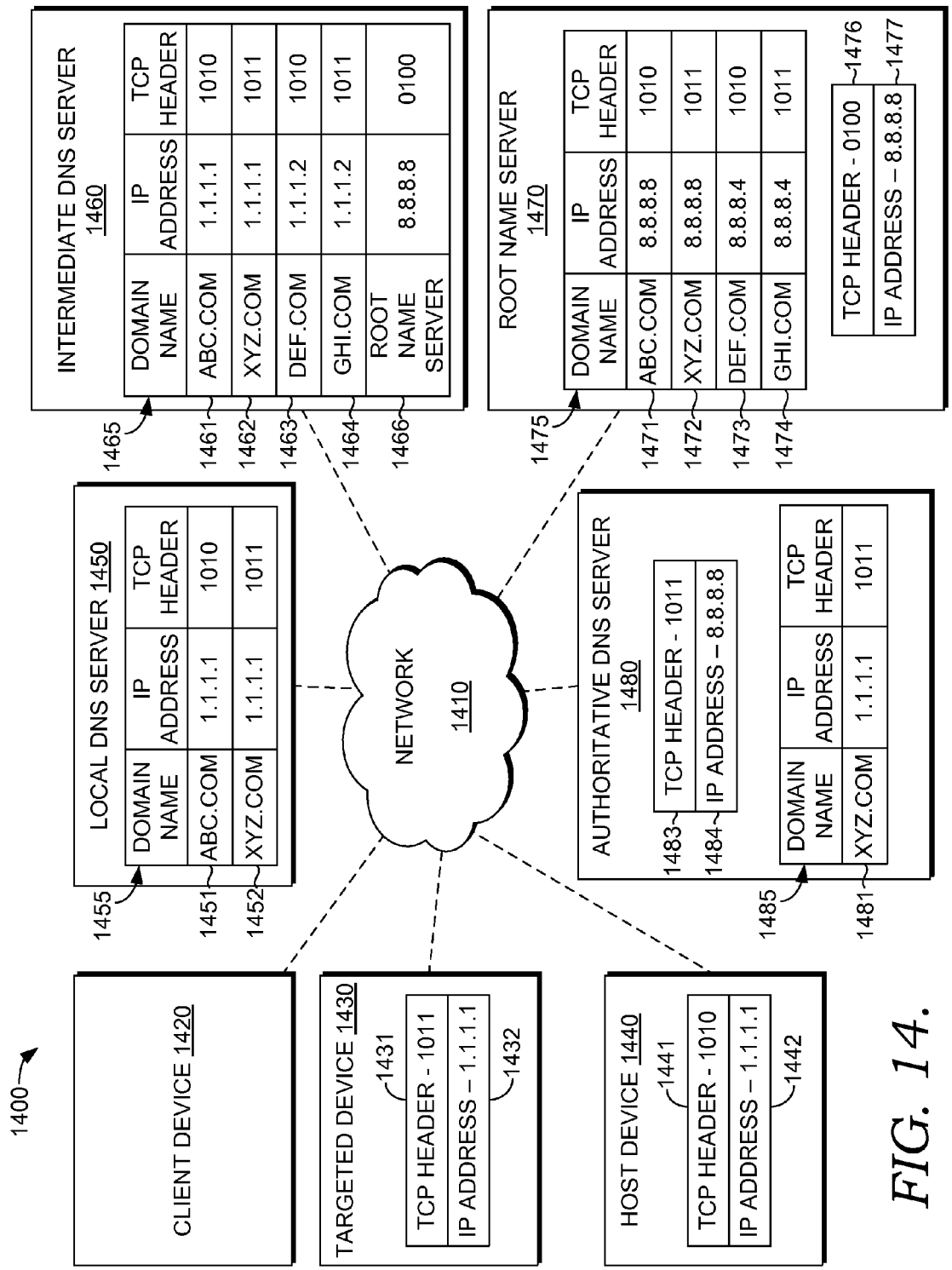
FIG. 14 is a block diagram illustrating an exemplary system architecture for resolving fractional IP addresses using domain name system (DNS)-enabled devices interconnected within a network, according to an embodiment of the present invention.

Referring now to FIG. 14, a block diagram illustrating an exemplary system architecture 1400 for resolving fractional IP addresses using DNS-enabled devices interconnected within a network is shown, in accordance with an embodiment of the present invention. As described herein, "DNS" provides an authoritative name-resolution structure that is configured as a hierarchical chain of servers that are interconnected over a network. However, other name-resolution structures may be employed to carry out the functionality, and embodiments of the present invention are not limited to servers that are provisioned with DNS capability.

Initially, FIG. 14 includes a client device 1420 (e.g., originating host device), targeted device 1430 (e.g., destination host device), host device 1440, local DNS server 1450, intermediate DNS server 1460, root name server 1470, and authoritative DNS server 1480 interconnected by way of a network 1410. In embodiments, the hierarchical chain of the DNS structure involves the local DNS server 1450 configured as a first-level resource for resolving the destination name into a fractional IP address. When the first-level resource is unable to fully satisfy a resolution of the destination name (e.g., the destination name is not cached at the local DNS server 1450), a second-level resource is then asked to participate in the resolution process. The second-level resource may be any one of a set, or tiers, of intermediate servers. As shown in FIG. 14, the second level resource may be represented as the intermediate DNS server 1460. When one or more of the second-level resources established within the hierarchical chain are unable to fully satisfy the resolution of the destination name (e.g., the destination name is not cached at the intermediate DNS server 1460), a third-level resource is then asked to participate in the resolution process. This third-level resource may be another set or tier of intermediate servers, or, as illustrated in FIG. 14, the third-level resource may comprise at least one root name server, such as the root name server 1470. In embodiments, the root name server(s) may store or have access to a comprehensive list of domain names 1475, and may typically be able to locate a domain name from the comprehensive list that corresponds with the destination name. Mapped to the corresponding destination name may be a fractional IP address of an authoritative DNS server, such as the authoritative DNS server 1480, that is capable of fully satisfying the resolution of the destination name.

Figure 15A:
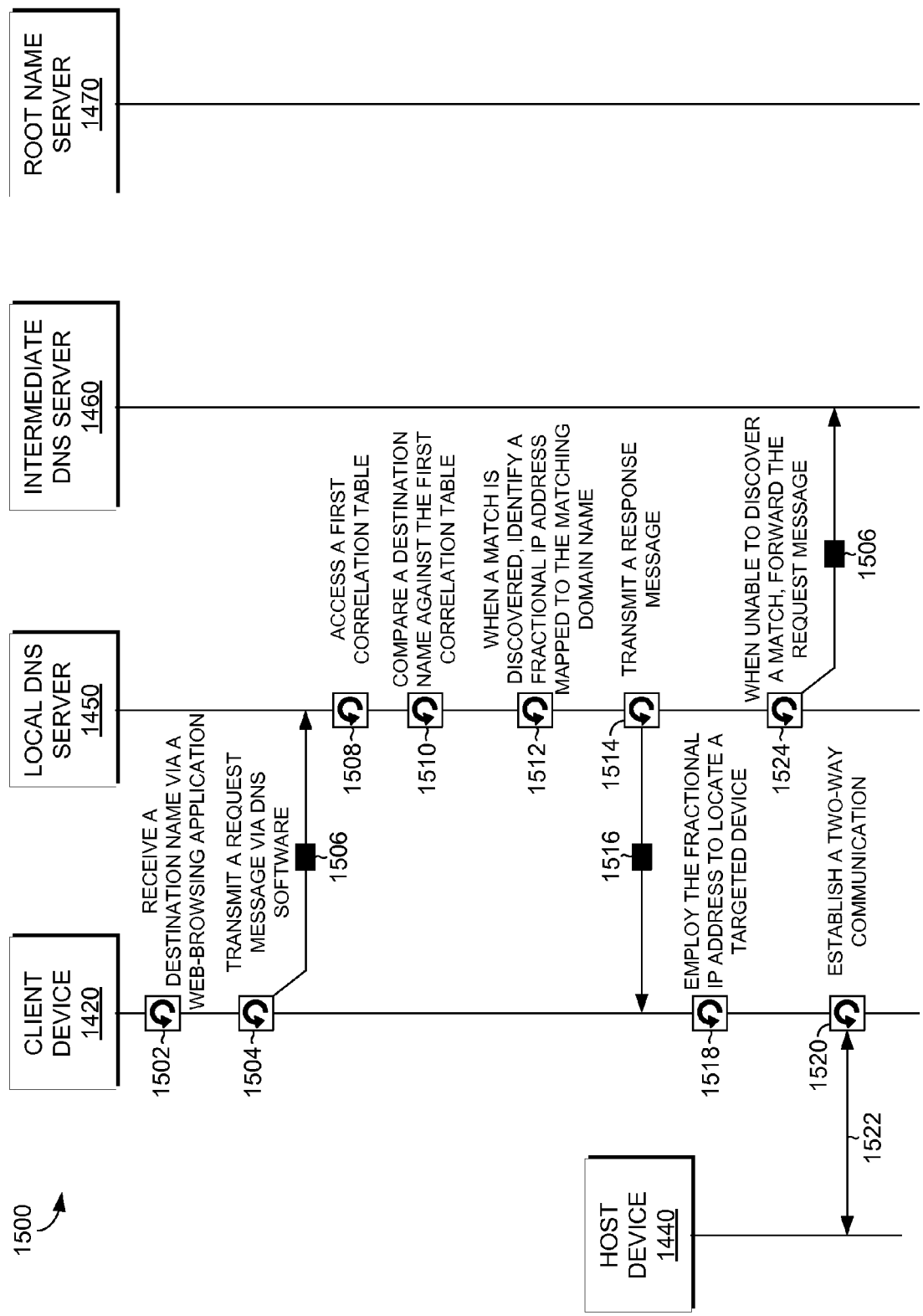
FIGS. 15A-15C show an operational flow diagram illustrating a high level overview of a technique for resolving a fractional IP address of a target device from a destination name associated with the target device of one embodiment of the present invention.
Figure 15B:
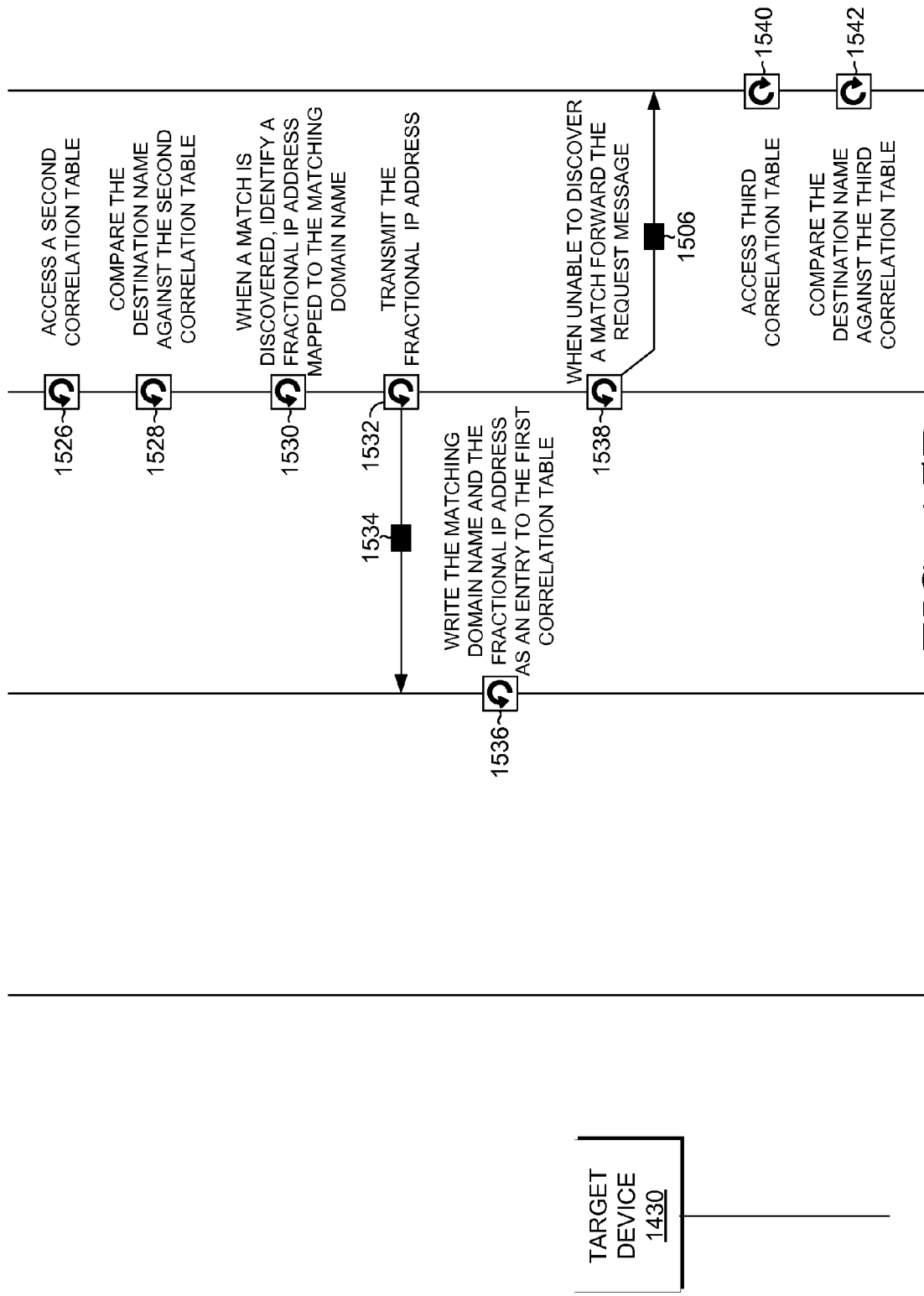
Figure 15C:
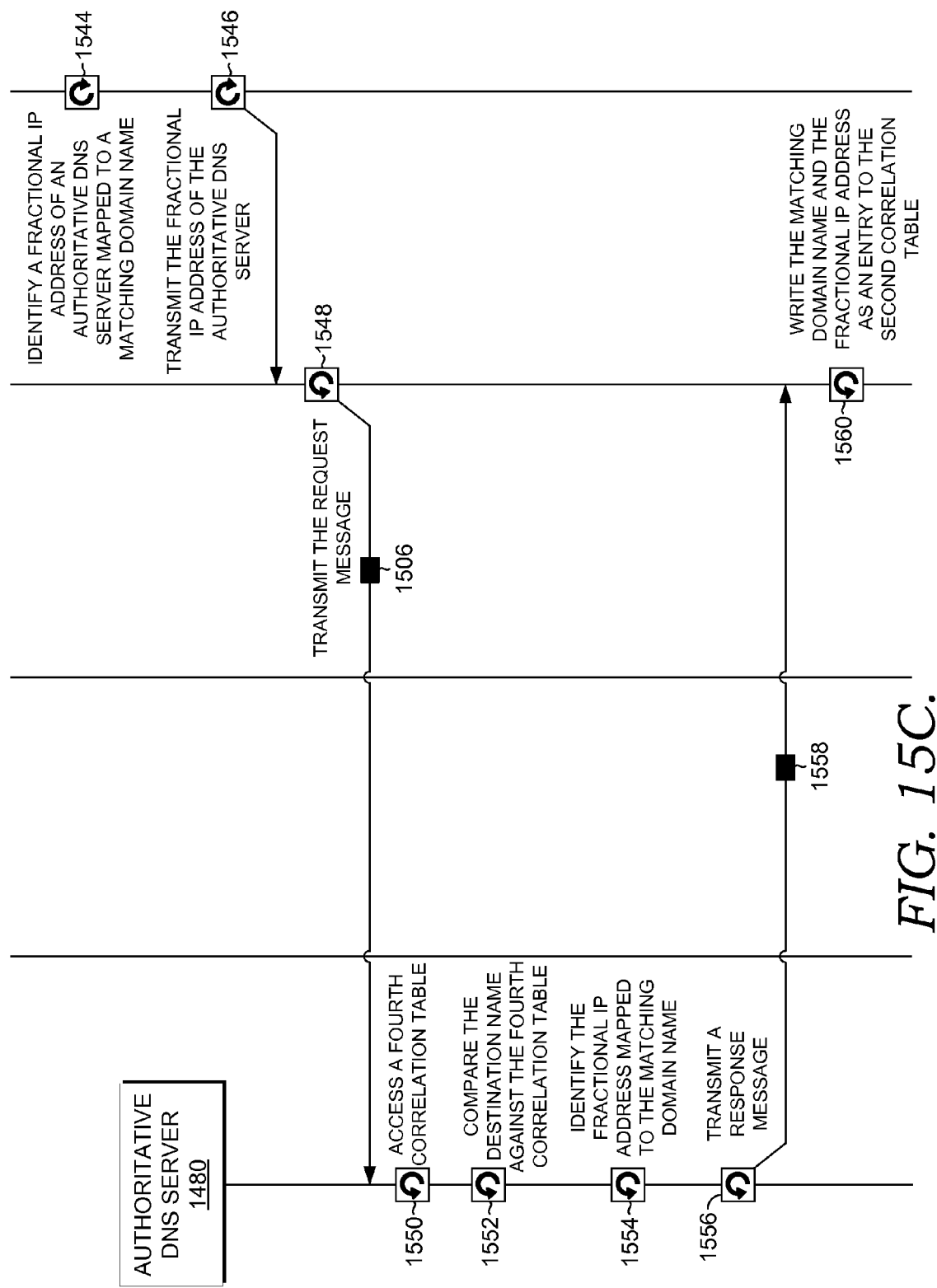

An exemplary scheme of operation that employs the devices and servers illustrated in FIG. 14 will now be discussed while considering an operational flow diagram 1500 shown in FIGS. 15A-15C. In particular, FIGS. 15A-15C show the operational flow diagram 1500 illustrating a high level overview of a technique for resolving a fractional IP address of a target device from a destination name associated with that target device, in accordance with one embodiment of the present invention. This technique for resolving the fractional IP address shown in the operational flow diagram 1500 is operable with the devices 1420, 1430, and 1440, as well as the servers 1450, 1460, 1470, and 1480, or a variety of other computing devices interconnected across the network 1410.

Initially, the devices and servers of FIG. 14 are assigned fractional IP addresses within the wired or wireless network 1410. As discussed above, each of the fractional IP addresses is constructed of an IP address paired with a value of a version field. Specifically, in embodiments, the fractional IP addresses may comprise an IPv4 address coupled with a four-bit indicator that is configured as a binary, transmission control protocol (TCP) header, which enables the devices to communicate among each other using their assigned fractional IP addresses. By way of example, the targeted device 1430 may be assigned a TCP header 1431 (1011) in conjunction with an IP address 1432 (1.1.1.1) to form its fractional IP address. The assigned fractional IP address is employed by servers and devices of FIG. 4 to locate and talk with the targeted device 1430. As discussed hereinabove, this fractional IP address assigned to the targeted device 1430 identifies the targeted device from other host devices interconnected within the network 1410. In instances, the fractional IP address may be assigned to the targeted device 1410 upon becoming active in the network 1410, upon being recognized by a network-managing entity, or upon another predefined triggering event in which the target device 1410 becomes visible as a component available for communication to other devices/servers.

Referring to FIG. 15A, as indicated at operation 1502, the client device 1420 may receive a destination name. As used herein, the phrase "destination name" is not meant to be limited to any format or convention of device name, but may encompass any identifier of a device, host, location, endpoint, or resource accessible via the network 1410. By way of example, if the targeted device 1430 is a website-hosting device, the destination name may represent a web address of the hosted website. In the embodiment shown in FIG. 14, the destination name that identifies the targeted device 1430 may be "xyz.com," while the destination name that identifies the host device 1440 may be "abc.com," for purposes of illustration and discussion.

Further, the host device 1440 is assigned a fractional IP address comprised of the TCP header 1441 (1010) and the IP address 1442 (1.1.1.1). As illustrated, the targeted device 1430 and the host device 1440 share a common IP address 1.1.1.1, but are assigned different values of the IP version field represented by 1011 and 1010, respectively. Thus, even though the common IP address 1.1.1.1 is being reused in this instance, the different values of the version field uniquely distinguish the devices 1430 and 1440, respectively, within the network 1410 and during the resolution process.

In one instance, the destination name of the targeted device 1440 may be received via a web-browsing application installed on the client device 1420. In this instance, a user may input the destination name at a text-entry area provided within a UI rendered by the web-browsing application. The web-browsing application may then pass the destination name to DNS software also installed on the client device 1420. As indicated at operation 1504, the DNS software may transmit the destination name within a payload of a request message 1506 to the local DNS server 1450. Although a particular system for acquiring and broadcasting the destination name has been described, it should be understood and appreciated by those of ordinary skill in the art that other types of suitable tools that provide a destination name may be used, and that embodiments of the present invention are not limited to a web-browsing application working in cooperation with DNS software, as described herein.

Upon receiving the request message 1506 at the local DNS server 1450, the request message 1506 is read and the destination name is retrieved from the request message 1506. As indicated at operation 1508, the destination name may be used to access a first correlation table, such as the first correlation table 1455 hosted at the local DNS server 1450. In an exemplary embodiment, the destination name is compared against the first correlation table 1455 to identify the IP address and the TCP header comprising a fractional IP address mapped to the destination name, as indicated at operations 1510 and 1512.

By way of example, if the destination name is "abc.com," then the local DNS server 1450 will determine a corresponding fractional IP address upon comparison of the destination name to the other names listed in the first correlation table 1455. In this example, the corresponding fractional IP address mapped to the domain name "abc.com" includes the IP address "1.1.1.1" and the TCP header "1010," as shown in entry 1451 of the first correlation table 1455. As such, this fractional IP address uniquely identifies the host device 1440 from other host devices interconnected within the network 1410.

Upon determining the matching fractional IP address, the local DNS server 1450 may return the fractional IP address to the client device 1420 via a response message 1516, as indicated by operation 1514. As indicated by operation 1518, the client device 1420 may employ the fractional IP address to locate the host device 1440 within the network 1410 (e.g., in order to access the website "abc.com" hosted by the host device). Once the host device 1440 is located using the fractional IP address, which was identified by the local DNS server 1450, an IP-layer, two-way communication 1522 may be established with the host device 1440, as indicated at operation 1520.

Assuming arguendo, for discussion purposes only, that the destination name is "xyz.com" and that a corresponding name is not presently listed in the first correlation table 1455 (i.e., line 1452 is absent). In this case, when the local DNS server 1450 receives the request message 1506 from the client device 1402, the DNS server 1450 will be unable to discover a name listed within first correlation table 1455, upon comparison thereto, that matches the destination name carried within the request message 1506. When a matching name is not discovered, the local DNS server 1450 forwards the request message 1506 to an intermediate DNS server 1406 that has access to a more extensive correlation table, such as a second correlation table 1465, having additional hosting-name entries 1463 and 1464 therein. Further, the second correlation table 1465 may include an entry 1466 that points to a root name server 1470 or other intermediate-level DNS servers.

Referring now to FIG. 15B, upon receiving the request message 1506 at the intermediate DNS server 1460, the request message 1506 is read and the destination name is retrieved from the request message 1506. As indicated at operation 1526, the destination name may be used to access the second correlation table 1465, which may reside at the intermediate DNS server 1460 or may be remotely hosted on another device within the network 1410, yet reviewable by the intermediate DNS server 1460. In an exemplary embodiment, the destination name is compared against the second correlation table 1465 to identify a fractional IP address, which is mapped to a listed name that matches the destination name, as indicated at operations 1528 and 1530.

By way of example, if the destination name is "xyz.com," then the intermediate DNS server 1460 will determine a corresponding fractional IP address upon comparison of the destination name to the other names listed in the second correlation table 1465. In this example, the corresponding fractional IP address mapped to the domain name "xyz.com" includes the IP address "1.1.1.1" and the TCP header "1011," as shown in entry 1462 of the second correlation table 1465. As such, this fractional IP address uniquely identifies the target device 1430 from other host devices interconnected within the network 1410.

Upon discovering the matching name within the second correlation table 1465 and identifying the fractional IP address mapped to the matching name, the intermediate DNS server 1460 may transmit the identified fractional IP address to client device 1420 for use in contacting the targeted device 1430 that may be reached by the identified fractional IP address. In another embodiment, the intermediate DNS server 1460 may transmit the identified fractional IP address to the local DNS server 1450 via a message 1534, as indicated at operation 1532. When the message 1534 is received at the local DNS server 1450, the identified fractional IP address may be extracted from the message 1534 and forwarded onto the client device 1420.

Further, the extracted fractional IP address may be written and stored as an entry (e.g., entry 1452) to the first correlation table 1455, as indicated at operation 1536. In one embodiment, the entry 1452 may include a mapping between the destination name (xyz.com) and the IP address (1.1.1.1) and/or the TCP header (1011) of the extracted factional IP address. Accordingly, the local DNS server 1450 can now find the fractional IP address associated with the destination name of the targeted device 1430 and can reply with the proper fractional IP address upon receiving a request message with the destination name "xyz.com." In another embodiment, the entry 1452 is cached at the first correlation table 1455 for a predefined amount of time. For instance, the entry 1452 may be removed from cache within the first correlation table 1455 when no additional request messages carrying the destination name "xyz.com" are received by the local DNS server 1450 prior to an expiration of the predefined timeframe; thus, freeing resources for more frequently requested fractional IP addresses.

Again, assuming arguendo that the destination name is "xyz.com" and that a corresponding name is not presently listed in the second correlation table 1465 (i.e., line 1462 is absent). In this case, when the intermediate DNS server 1460 receives the request message 1506 forwarded from the local DNS server 1450, the intermediate DNS server 1460 will be unable to discover a name enumerated within the second correlation table 1465 that matches the destination name, as indicated at operation 1538. As such, the intermediate DNS server 1460 may forward the request message 1506 to another device within the network 1410 for resolution. In one instance, this other network device may be another DNS server that participates in the resolution process and that is positioned higher within the hierarchical chain of the DNS structure. For example, the network device may be another intermediate DNS server, such as a third-level (intermediate) DNS server (not shown) that has access to a more extensive correlation table than the second-level (intermediate) DNS server 1460. Or, in another instance, the other network device may be the root name server 1470.

When the intermediate DNS server 1460 is configured to automatically pass the request message 1506 to the root name server 1470 (upon failing to discover a match within the second correlation table 1465), the intermediate DNS server 1460 may inspect the second correlation table 1465 to ascertain a fractional IP address of the root name server 1470. By way of example, when the destination name "xyz.com" is not discovered within the second correlation table 1465, the default entry 1466 pointing to the root name server 1470 is returned to the intermediate DNS server 1460. In this example, the default entry 1466 includes the IP address 1477 (8.8.8.8) and the TCP header 1476 (0100) of root name server's 1470 fractional IP address, which is used to address the request message 1506.

Upon the proper root name server 1470 (e.g., assigned the TCP header 1476 (0100) and the IP address 1477 (8.8.8.8)) receiving the request message 1506 from an intermediate DNS device of the DNS structure, such as the intermediate DNS server 1460, the root name server 1470 accesses a comprehensive correlation table. In embodiments, the comprehensive correlation table is represented by a third correlation table 1475, that includes fractional IP addresses of authoritative DNS servers, as opposed to fractional IP addresses of host devices. This operation is indicated by reference numeral 1540. As indicated at operations 1542 and 1544 (see FIG. 15C), the destination name carried in the request message 1506 is compared against entries within the third correlation table 1475 and a fractional IP address of a DNS server, such as authoritative DNS server 1480, mapped to a matching domain name is identified. In a particular embodiment, entry 1472 of the third correlation table 1475 may include a domain name that matches the destination name "xyz.com." The matching domain name may be mapped to an IP address "8.8.8.8" and a TCP header "1011" that form the fractional IP address of the authoritative DNS server 1480.

Typically, the authoritative DNS server 1480 may be an initial point of storage of a fractional IP address allocated to a website with a domain name. In some instances, if the website has achieved a high level of use, a plurality of IP versions (i.e., a plurality of fractional IP addresses that share the same IP address) may be registered for a specific domain name associated with the popular website. The plurality of fractional IP addresses may accommodate various types of networks or physical separation. However, if only one fractional IP address is registered for the domain name, the authoritative DNS server 1480 may be responsible for determining the best way to reach the server and for selecting the best IP version based on the reachability determination.

Once the fractional IP address(es) for a domain name are determined, the fractional IP address(es) are mapped to the domain name and the mapping is loaded as an entry within a correlation table, such as the fourth correlation table 1485. The process of loading may comprise manually storing the mapping upon a website coming online or automatically programming the mapping as the entry 1481 to the fourth correlation table 1485. The authoritative DNS server 1480 may then feed the entry 1481 in association with its TCP header 1483 (1011) and IP address 1484 (8.8.8.8) to a root name server (e.g., root name server 1470) that populates the association to a correlation table (e.g., entry 1472 within the third correlation table 1475). This information is accessed and distributed to other DNS servers upon being solicited thereby for fractional IP addresses.

For instance, upon the root name server 1470 identifying the fractional IP address of the authoritative DNS server 1480, which is mapped to the domain name "xyz.com" within entry 1472, the authoritative DNS server 1480 may transmit the identified fractional IP address to the intermediate DNS server 1460 for purposes of resolution, as indicated at operation 1546 of FIG. 15C. The intermediate DNS server 1460 accepts the identified fractional IP address and uses it to address the request message 1506. Thus, as indicated at operation 1548, the request message 1506 is transmitted from the intermediate DNS server 1460 to the proper authoritative DNS server 1480 because the request message 1506 now includes within its header the fractional IP address (IP address 8.8.8.8 and TCP header 1011) of the authoritative DNS server 1480 that holds the fractional IP address of the destination name "xyz.com" within the payload.

Upon the proper authoritative DNS server 1480 receiving the request message 1506 from the intermediate DNS device 1460, the authoritative DNS server 1480 accesses the fourth correlation table 1485, that includes fractional IP addresses of a set of host devices, whose fractional IP addresses are originally input thereto as discussed above. This operation is indicated by reference numeral 1550. As indicated at operations 1552 and 1554, the destination name carried in the request message 1506 is compared against entries within the fourth correlation table 1485 and a fractional IP address of a host device, such as the targeted device 1430, mapped to a matching domain name is identified. In a particular embodiment, entry 1481 of the fourth correlation table 1485 may include a domain name that matches the destination name "xyz.com." The matching domain name may be mapped to an IP address "1.1.1.1" and a TCP header "1011" that form the fractional IP address of the targeted device 1430.

Upon discovering the matching name within the fourth correlation table 1485 and identifying the fractional IP address mapped to the matching name, the authoritative DNS server 1480 may transmit the identified fractional IP address to client device 1420 for use in contacting the targeted device 1430 that may be reached by the identified fractional IP address. In another, embodiment, the authoritative DNS server 1480 may transmit the identified fractional IP address to the intermediate DNS server 1460 via a message 1558, as indicated at operation 1556. When the message 1558 is received at the intermediate DNS server 1460, the identified fractional IP address may be extracted from the message 1558 and forwarded onto the client device 1420 via the local DNS server 1450.

Further, the extracted fractional IP address may be written and stored as an entry (e.g., entry 1462) to the second correlation table 1465, as indicated at operation 1560. In one embodiment, the entry 1462 may include a mapping between the destination name (xyz.com) and the IP address (1.1.1.1) and/or the TCP header (1011) of the extracted factional IP address. Accordingly, the intermediate DNS server 1460 can now find the fractional IP address associated with the destination name of the targeted device 1430 and can reply with the proper fractional IP address upon receiving a request message with the destination name "xyz.com."

Figure 16:
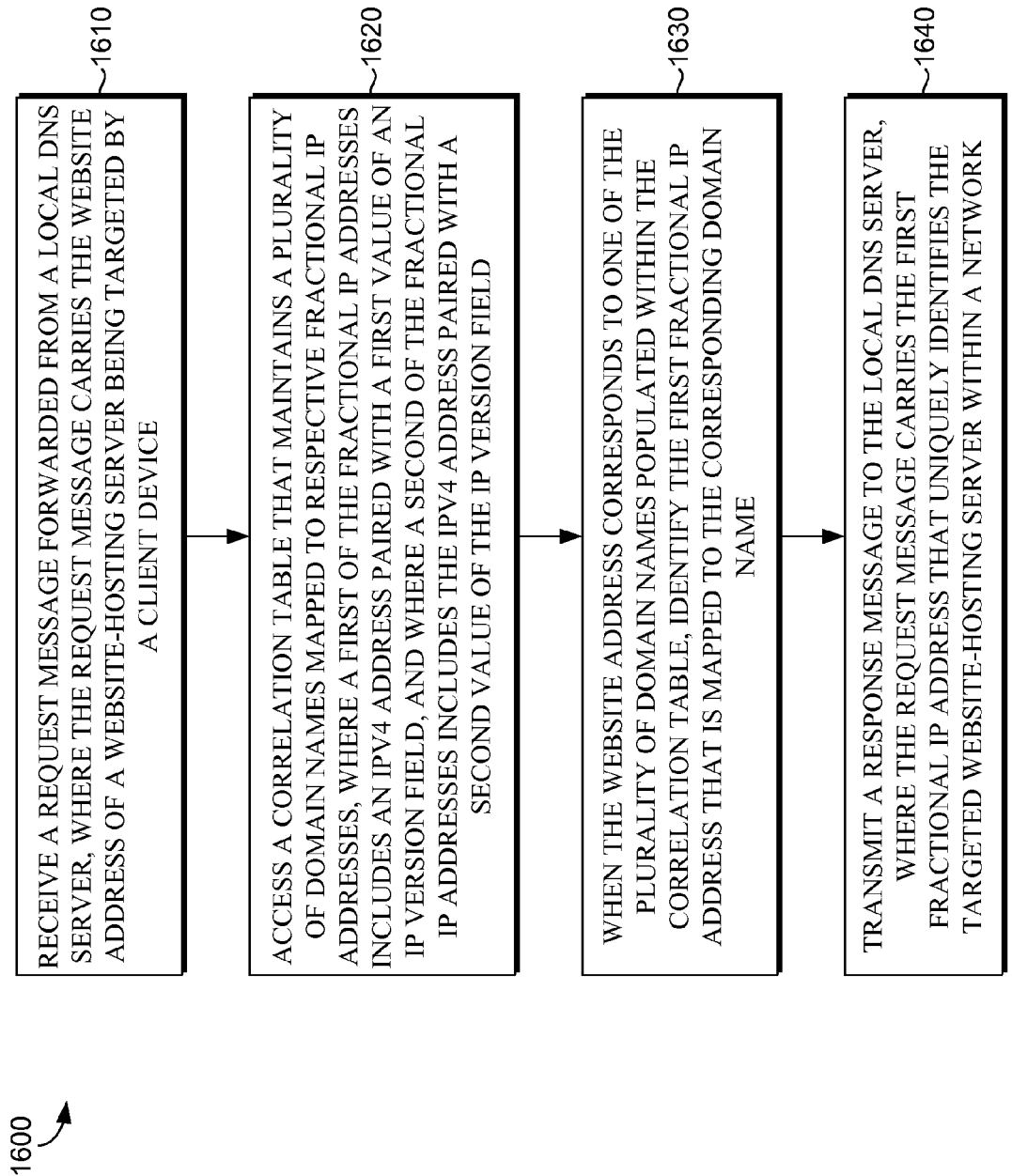
FIG. 16 is a flow chart of an exemplary method, employed by an intermediate DNS server, for determining a destination fractional IP address as a function of a website address, according to an embodiment of the present invention.

With reference to FIG. 16, a flow chart of an exemplary method 1600, employed by an intermediate DNS server, for determining a destination fractional IP address as a function of a website address is shown, according to an embodiment of the present invention. Initially, the method 1600 involves the step of receiving a request message forwarded from a local DNS server, as depicted at block 1610. As discussed above, the local DNS server passes forward the request message from a client device when the local DNS server is unable to satisfy the request message. Typically, the request message carries the website address of a website-hosting server being targeted by the client device.

In embodiments, the client device that is attempting to establish a connection by originating the request message knows the website name of the service it wants to reach. Further, the client device knows how to locate the local DNS server assigned to serve the client device. Generally, the local DNS server is responsible for performing the address-caching functionality for the assigned client device. As such, the client device is configured to communicate DNS queries to the local DNS server automatically. As mentioned previously, the DNS queries may be invoked by a search parameter input to a web browser, or other application, that relies upon the DNS software (e.g., underlying the web-browser operation) installed on a client device.

As depicted at block 1620, the method 1600 further involves the step of accessing a correlation table (e.g., second correlation table 1465 of FIG. 14) that maintains a plurality of domain names mapped to respective fractional IP addresses. When the website address corresponds to one of the plurality of domain names populated within the correlation table, as depicted at block 1630, the intermediate DNS server identifies a fractional IP address that is mapped to the corresponding domain name. As depicted at block 1640, a response message is transmitted to the local DNS server. As discussed above, the response message carries the fractional IP address that uniquely identifies the targeted website-hosting server within a network.

When the website address does not compare to one of the plurality of domain names populated within the correlation table, the intermediate DNS server may attempt to ascertain the targeted website-hosting server's network layer (layer 3) address, or fractional IP address, by invoking a resolution process. In instances, the resolution process involves utilizing a hierarchical chain of servers provisioned with DNS-lookup functionality to translate the destination name (e.g., Sprint.com) of the targeted website-hosting server to the fractional IP address assigned to the targeted website-hosting server (e.g., comprising a TCP header paired with an IPv4 address that are utilized in a combination to direct conveyance of any communications). As mentioned above, the value of the IP version field is represented by at least one four-bit indicator (e.g., TCP header) 1000, 1001, 1010, or 1011 that typically indicates one of IPv0, IPv1, IPv2, IPv3, or IPv4, respectively. This resolved IPv4 address in conjunction with the value of the IP version field correspond to a unique fractional IP address within the network 1410.

Figure 17:
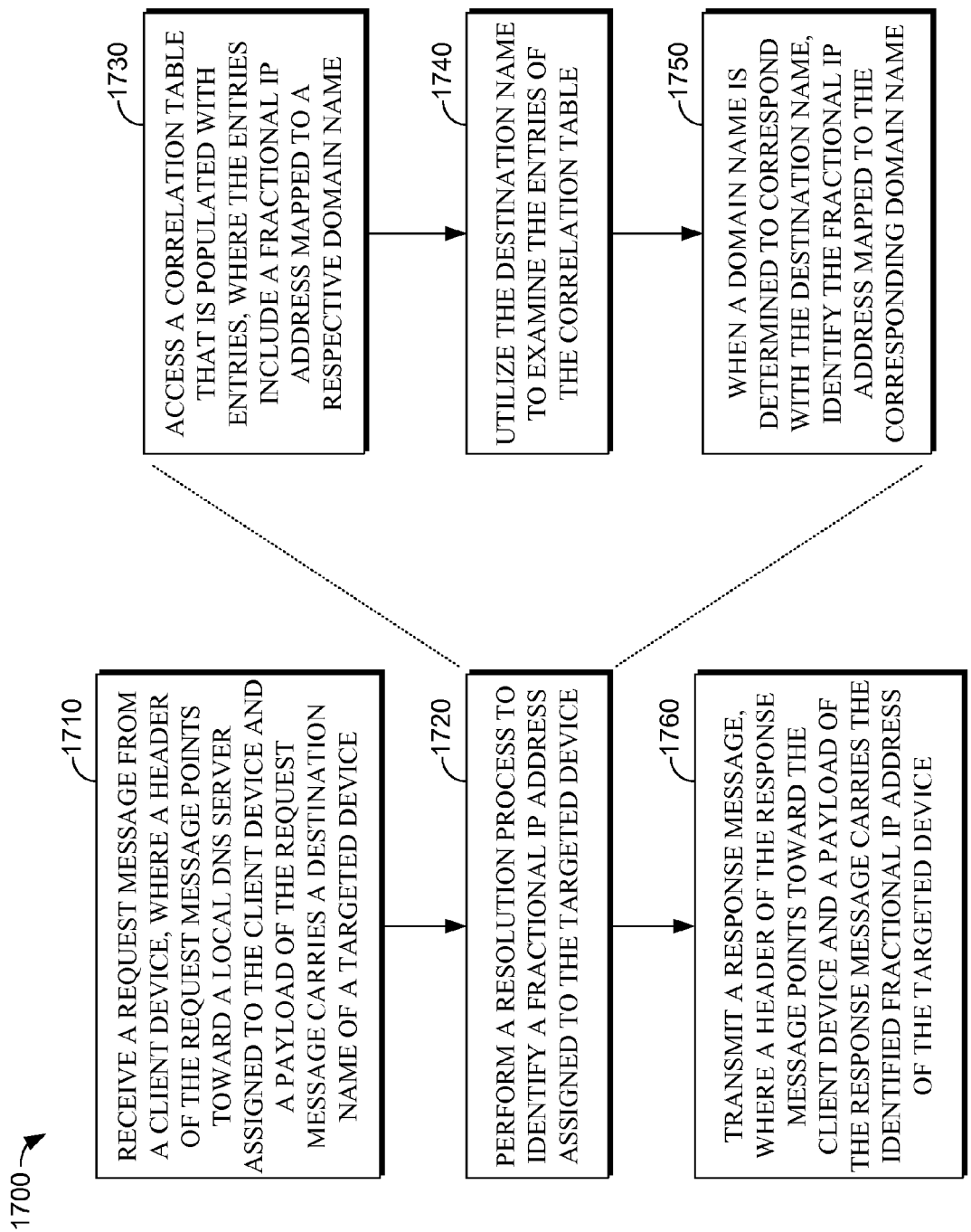
FIG. 17 is a flow chart of an exemplary method for conducting a forward DNS lookup, according to an embodiment of the present invention.

Turning now to FIG. 17, a flow chart of an exemplary method 1700 for conducting a forward DNS lookup is shown, according to an embodiment of the present invention. Initially, the method 1700 includes the step of receiving a request message from a client device, as depicted at block 1710. Typically, a header of the request message points toward a local DNS server assigned to the client device and a payload of the request message carries a destination name of a targeted device. Next, the local DNS server performs a resolution process to identify a fractional IP address assigned to the targeted device. In an example embodiment, the resolution process comprises, at least, the following steps: accessing a correlation table that is populated with entries comprising a fractional IP address mapped to a respective domain name (see block 1730); utilizing the destination name to examine the entries of the correlation table (see block 1740); and when a domain name is determined to correspond with the destination name, identifying the fractional IP address mapped to the corresponding domain name (see block 1750). Upon identifying the fractional IP address, it is transmitted back to the client device within a response message, as depicted at block 1760.

If the fractional IP address cannot be identified within the correlation table (i.e., no corresponding entries are cashed at the local DNS server), the local DNS server may forward the request message to a graduated DNS server (e.g., intermediate DNS server 1460 of FIG. 14) that is one level of authority above the local DNS server to determine whether the graduated DNS server can resolve the request message. That is, the local DNS server is configured to push the request message up to the next level in the hierarchical chain of the DNS structure in an attempt to achieve resolution. Potentially, this step of pushing up the request message happens recursively until one of the levels recognizes the destination names. Or, one of the DNS servers may determine that it has stored in cache the fractional IP address of an authoritative DNS server associated with the destination name, and, if so, that DNS server sends the request message to the authoritative DNS server directly. Finally, when none of the DNS servers in the hierarchical chain can satisfy the request message, the request message is pushed up to a root name server (e.g., root name server 1470 of FIG. 14).

Generally, as used herein, the phrase "root name server" broadly refers to a top-level entity that is an authoritative record-holder for a particular domain (e.g., stores each of the names for the domain). If the root name server cannot recognize the destination name, the fractional IP address likely does not exist as a valid location within a domain. If the root name server does recognize the destination name, the root name server may will direct the request message to the authoritative DNS server, which is the authority for a domain that maintains the initial mapping, or respond to the request message with the appropriate fractional IP address when the root name server is aware thereof.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computer system for resolving fractional IP addresses using domain name system (DNS)-enabled devices interconnected within a network, the system comprising:
   a local DNS server that accesses a first correlation table,
   wherein the first correlation table maintains a mapping between a plurality of the fractional IP addresses and a plurality of domain names, and
   wherein the plurality of fractional IP addresses include IPv4 addresses paired with respective values of IP version fields; and
   a client device that transmits a request message to the local DNS server,
   wherein the request message includes a destination name of a device targeted by the client device, and
   wherein, upon receiving the request message, the local DNS server compares the destination name against the first correlation table and, when a match is discovered within the plurality of domain names therein, the local DNS server conveys to the client device a fractional IP address mapped to the matching domain name,
   wherein the mapped fractional IP address includes a particular IPv4 address paired with a first value of an IP version field, and
   wherein another fractional IP address that includes the particular IPv4 address and a second value of an IP version field is mapped to an non-matching domain name.

2. The computer system of claim 1, further comprising the targeted device that is active on the network, wherein the targeted device hosts a website, and wherein the destination name represents a web address of the website.

3. The computer system of claim 1, wherein the targeted device is assigned the mapped fractional IP address upon becoming active within the network, and wherein the identified factional IP address uniquely identifies the targeted device from other host devices interconnected within the network.

4. The computer system of claim 1, wherein, upon receiving the transmission of the mapped fractional IP address, the client device employs the mapped fractional IP address to locate and establish an IP-layer, two-way communication with the targeted device.

5. The computer system of claim 1, wherein, upon the client device becoming active within the network, the local DNS server is automatically assigned thereto.

6. The computer system of claim 1, wherein a web-browser application is installed on the client device, and wherein the web-browser application renders a user interface for accepting the destination name from a user of the client device.

7. The computer system of claim 1, wherein DNS software is installed on the client device, and wherein the DNS software retrieves the destination name from the web-browser application, accesses a DNS entry stored on the client device, and routes the transmission of the request message to the local DNS sever utilizing information read from the DNS entry.

8. The computer system of claim 1, further comprising an intermediate DNS server that accesses a second correlation table that maintains a more extensive mapping than the first correlation table, wherein, when the local DNS server is unable to discover a domain name that matches the destination name from within the plurality of domain names populated within the first correlation table, the local DNS server forwards the request message to the intermediate DNS server.

9. The computer system of claim 8, wherein, upon receiving the request message, the intermediate DNS server compares the destination name against the second correlation table and, when a match is discovered within a plurality of domain names therein, the intermediate DNS server identifies and transmits to the local DNS server a fractional IP address mapped to the matching domain name.

10. The computer system of claim 9, wherein, upon receiving the transmission of the mapped fractional IP address from the intermediate DNS server, the local DNS server writes the mapped fractional IP address and the destination name mapped thereto as an entry in the first correlation table.

11. The computer system of claim 10, wherein the entry that includes the mapped fractional IP address and the destination name mapped thereto is cached in the first correlation table for a predefined timeframe, wherein, if no additional request messages carrying the destination name are received by the local DNS server prior to an expiration of the predefined timeframe, the cached mapping is removed from the first correlation table.

12. The computer system of claim 9, further comprising a root name server that accesses a third correlation table that maintains a mapping between fractional IP addresses of authoritative DNS servers and a comprehensive list of domain names, wherein, when the intermediate DNS server is unable to discover a domain name that matches the destination name from within the plurality of domain names populated within the second correlation table, the intermediate DNS server forwards the request message to the root name server.

13. The computer system of claim 12, wherein, upon receiving the request message, the root name server compares the destination name against the third correlation table and, when a match is discovered within the plurality of domain names therein, the root name server identifies and transmits to the intermediate DNS server a fractional IP address of a authoritative DNS server mapped to the matching domain name.

14. The computer system of claim 13, further comprising the authoritative DNS server that accesses a fourth correlation table that maintains an initial mapping between fractional IP addresses and domain names of host devices, wherein respective custodians of the host devices are permitted to write original entries to the fourth correlation table.

15. The computer system of claim 14, wherein, upon receiving the request message forwarded from the intermediate DNS server, the authoritative DNS server compares the destination name against the fourth correlation table and, when a match is discovered within the original entries therein, the authoritative DNS server transmits to the intermediate DNS server a fractional IP address mapped to the matching domain name.

16. A computerized method, employed by an intermediate destination name system (DNS) server, for determining a destination fractional IP address as a function of a website address, the method comprising:
   receiving a request message forwarded from a local DNS server, wherein the request message carries the website address of a website-hosting server being targeted by a client device, and wherein the local DNS sever failed to satisfy the request message;
   accessing a correlation table that maintains a plurality of domain names mapped to respective fractional IP addresses, wherein a first of the fractional IP addresses includes an IPv4 address paired with a first value of an IP version field, and wherein a second of the fractional IP addresses includes the IPv4 address paired with a second value of the IP version field;
   when the website address corresponds to one of the plurality of domain names populated within the correlation table, identifying the first fractional IP address that is mapped to the corresponding domain name; and transmitting a response message to the local DNS server, wherein the request message carries the first fractional IP address that uniquely identifies the targeted website-hosting server within a network, and wherein the second fractional IP address uniquely identifies a server within the network that is distinct from the targeted website-hosting server.

17. The computerized method of claim 16, further comprising, when the website address does not correspond to one of the plurality of domain names populated within the correlation table, forwarding the request message to a root DNS server that has access to a mapping between fractional IP addresses of authoritative DNS servers and a comprehensive list of domain names.

18. The computerized method of claim 16, wherein, upon receiving the response message, the local DNS server temporarily stores a mapping between the first fractional IP address and the website address, and wherein the stored mapping enables the local DNS server to satisfy subsequent request messages that carry the website address of the website-hosting server.

19. One or more non-transitory computer-readable media having computer-executable instructions embodied thereon that, when executed, perform a method for conducting a forward domain name system (DNS) lookup, the method comprising:

receiving a request message from a client device, wherein a header of the request message points toward a local DNS server assigned to the client device and a payload of the request message carries a destination name of a targeted device;

performing a resolution process to identify a fractional IP address assigned to the targeted device, wherein the resolution process comprises:
  (a) accessing a correlation table that is populated with entries, wherein the entries include a fractional IP address mapped to a respective domain name, and wherein the fractional IP address includes a value of an IP version field paired with an IPv4 address, and wherein the IPv4 address paired with differing values of IP version fields constitute distinct fractional IP addresses;
  (b) utilizing the destination name to examine the entries of the correlation table; and
  (c) when a domain name is determined to correspond with the destination name, identifying the fractional IP address mapped to the corresponding domain name; and transmitting a response message, wherein a header of the response message points toward the client device and a payload of the response message carries the identified fractional IP address of the targeted device.

* * * * *